United States Patent
Shibayama et al.

(10) Patent No.: US 8,901,472 B2
(45) Date of Patent: Dec. 2, 2014

(54) IMAGE DISPLAYING APPARATUS INCLUDING A PROJECTION OPTICAL SYSTEM AND A REFLECTIVE IMAGE DISPLAY ELEMENT WITH PLURAL MICRO-MIRRORS

(75) Inventors: Yasuyuki Shibayama, Kanagawa (JP); Takanobu Osaka, Kanagawa (JP); Yoshio Kubo, Tokyo (JP); Tetsuya Fujioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 213 days.

(21) Appl. No.: 13/584,001

(22) Filed: Aug. 13, 2012

(65) Prior Publication Data
US 2013/0044294 A1 Feb. 21, 2013

(30) Foreign Application Priority Data
Aug. 16, 2011 (JP) .................................. 2011-177824

(51) Int. Cl.
| H01L 27/00 | (2006.01) |
| G03B 21/28 | (2006.01) |
| G02B 19/00 | (2006.01) |
| G03B 21/14 | (2006.01) |

(52) U.S. Cl.
CPC ............ *G02B 19/0023* (2013.01); *G03B 21/28* (2013.01); *G02B 19/0047* (2013.01); *G03B 21/142* (2013.01)
USPC ........................................ 250/208.1; 250/216

(58) Field of Classification Search
USPC ............. 250/208.1, 216, 239; 353/73, 77, 99, 353/69; 359/263, 290–292, 223, 224
See application file for complete search history.

(56) References Cited

U.S. PATENT DOCUMENTS

| 6,129,437 A | 10/2000 | Koga et al. |
| 6,575,580 B2 | 6/2003 | Okamori et al. |
| 6,724,546 B2 | 4/2004 | Nishimae et al. |
| 7,507,942 B2 | 3/2009 | Tatsuno |
| 7,561,336 B2 | 7/2009 | Osaka et al. |
| 7,697,188 B2 * | 4/2010 | Maeda et al. .................. 359/263 |
| 7,753,531 B2 | 7/2010 | Fujita et al. |

(Continued)

FOREIGN PATENT DOCUMENTS

| EP | 0 901 030 A1 | 3/1999 |
| JP | 2000-098272 | 4/2000 |

(Continued)

OTHER PUBLICATIONS

The Extended European Search Report issued Jan. 7, 2013, in Application No. / Patent No. 12180289.6-2216.

*Primary Examiner* — Que T Le
(74) *Attorney, Agent, or Firm* — Oblon, Spivak, McClelland, Maier & Neustadt, L.L.P.

(57) ABSTRACT

An image displaying apparatus including a light source, a light condenser for condensing light to form a condensed light image, a light mixing element, a reflective image displaying element having plural micro-mirrors for changing an inclination angle of an individual micro-mirror between an on-state and an off-state, an illumination optical system including a condenser lens and a mirror for illumination, and a projection optical system for projecting reflected light from a micro-mirror being at an on-state among plural micro-mirrors constituting the reflective image displaying element, wherein the mirror for illumination is at a position nearest the reflective image displaying element on an optical path from the light mixing element to the reflective image displaying element and a reflection surface of this mirror for illumination is positioned at a side of the reflective image displaying element with respect to a projection lens system constituting a part of the projection optical system.

10 Claims, 18 Drawing Sheets

(56) References Cited

U.S. PATENT DOCUMENTS

| | | |
|---|---|---|
| 7,857,458 B2 | 12/2010 | Fujita et al. |
| 2002/0008791 A1 | 1/2002 | Okamori et al. |
| 2003/0222980 A1 | 12/2003 | Miyagaki et al. |
| 2004/0070738 A1 | 4/2004 | Sekiguchi et al. |
| 2005/0111072 A1 | 5/2005 | Miyagaki et al. |
| 2006/0039068 A1 | 2/2006 | Tokita et al. |
| 2006/0044795 A1 | 3/2006 | Tatsuno |
| 2006/0192903 A1 | 8/2006 | Takaura et al. |
| 2007/0008495 A1 | 1/2007 | Miyagaki et al. |
| 2007/0024977 A1 | 2/2007 | Kawamura et al. |
| 2009/0091928 A1 | 4/2009 | Tatsuno |
| 2013/0107166 A1* | 5/2013 | Osaka et al. ............ 349/61 |

FOREIGN PATENT DOCUMENTS

| | | |
|---|---|---|
| JP | 3121843 | 1/2001 |
| JP | 2002-268010 | 9/2002 |
| JP | 2003-307708 | 10/2003 |
| JP | 2004-177801 | 6/2004 |
| JP | 2007-034102 | 2/2007 |
| JP | 4027712 | 12/2007 |
| JP | 2008-134640 | 6/2008 |
| JP | 4158317 | 10/2008 |
| JP | 2010-044430 | 2/2010 |
| JP | 2011-112811 | 6/2011 |

* cited by examiner

IMAGE DISPLAYING APPARATUS INCLUDING A PROJECTION OPTICAL SYSTEM AND A REFLECTIVE IMAGE DISPLAY ELEMENT WITH PLURAL MICRO-MIRRORS

BACKGROUND OF THE INVENTION

1. Field of the Invention

One aspect of the present invention relates to an image displaying apparatus.

2. Description of the Related Art

For an image displaying apparatus which is referred to as a projector in general, there is provided a CRT projector, a liquid crystal projector, a Digital Micromirror Device (DMD) projector, or the like, depending on the kind of an image displaying element. The DMD is a reflective image displaying element which has plural micro-mirrors arranged two-dimensionally, wherein an inclination angle of an individual micro-mirror is changed to turn on or off reflected light. An image displaying apparatus according to an embodiment of the present invention may include a reflective image displaying element such as the DMD for an image displaying element. For a publicly known technique which is to provide an image displaying apparatus with a reflective image displaying element and may be relevant to an image displaying apparatus according to an embodiment of the present invention, there is provided a technique as described in Japanese Patent Application Publication No. 2000-098272, Japanese Patent No. 3121843, Japanese Patent No. 4027712, or Japanese Patent No. 4158317, as mentioned below.

Japanese Patent Application Publication No. 2000-098272 describes an image displaying apparatus including a white light source, a color filter, a condenser lens, a plane mirror, a spherical mirror, a DMD as being one kind of a reflective image displaying element, and a projection lens being arranged in this order, the spherical mirror being arranged directly beneath an entrance portion of the projection lens, and a central axis of the condenser lens and a central axis of the projection lens intersect at a predetermined angle when viewed from a plane. An image displaying apparatus as described in Japanese Patent No. 3121843 has almost the same configuration as an image displaying apparatus as described in Japanese Patent Application Publication No. 2000-098272, wherein a folding mirror for reflecting a light ray(s) having passed through a condenser lens to be guided to a DMD is a single concave shape mirror and this folding mirror is arranged away from an optical path of reflected light which is directed from a micro-mirror of the DMD to a projection lens.

In an image displaying apparatus as described in Japanese Patent Application Publication No. 2000-098272 or Japanese Patent No. 3121843, a folding mirror for reflecting a light ray(s) having passed through a condenser lens to be guided to a DMD is arranged at an exit end side with respect to an entrance end or an end at a DMD side of a holder for holding a projection lens (referred to as a "lens barrel" below). Accordingly, a physical interference between the folding mirror and the lens barrel may be caused and the folding mirror may have to be notched extensively depending on an outer shape of a lens barrel, whereby considerable reduction in an amount of light for illuminating a DMD or an irregularity in an illuminance may readily be caused to degrade a quality of a projected image. If a notch of the spherical mirror is made small in order to solve such a problem(s), it may be necessary to decrease an aperture of a projection lens, in particular, an aperture of a projection lens between a position of the arranged spherical mirror and an end at a DMD side, whereby another problem of reduction in a speed of a projection lens or restriction on the degree of freedom of designing of a projection lens may occur.

Japanese Patent No. 4027712 describes an image displaying apparatus wherein illumination light emitted from a lamp light source enters a Total Internal Reflection (TIR) prism through a parabolic reflector, a rod integrator, and a light condensing optical system, then illumination light totally-internal reflected by the TIR prism illuminates a DMD, and light reflected by the DMD enters a projection lens through the TOR prism again.

According to an image displaying apparatus as described in Japanese Patent No. 4027712, there may be provided an advantage that it may be possible to set a reflection surface of a TIR prism near a center of a DMD and in the neighborhood of an optical axis of a projection lens. On the other hand, there may be a problem(s) that two prisms in which a precision of a surface and a precision of an angle between surfaces with respect to one another are finished by a polishing process so that high precisions may be necessary in order to constitute a TIR prism and it may be necessary to integrate such two prisms at a high precision whereby its cost may be higher than the case where an optical system for illuminating a DMD is configured by using a mirror. Furthermore, an optical path is folded by means of total reflection inside a TIR prism but such a TIR prism has loss of reflection at many surfaces such as (1) an entrance surface of a prism, (2) an exit surface of a DMD for irradiation light, (3) a reflected light entrance surface of a DMD, (4) a boundary surface of a prism (at an exit side), (5) a boundary surface of a prism (at an entrance side), and (6) an exit surface of a prism, which may be a factor of reduction in efficiency of use of illumination light. Moreover, a mass of a TIR prism may be greater than that of a mirror, and hence, may be a factor inhibiting attainment of a lightweight image displaying apparatus.

Japanese Patent No. 4158317 describes a projection-type displaying apparatus including an illumination device in which a luminous body, light condensing means, light mixing means, a first lens group, a second lens group, and a light valve as being one kind of a reflective image displaying element are arranged in this order, and further including a projection lens (corresponding to a projection optical system) for transmitting light emitted from the light valve to a screen.

In a displaying apparatus as described in Japanese Patent No. 4158317, a part of a second lens group which is one of optical components constituting an illumination optical system is also shaded by a lens barrel for a projection lens and a part of a second lens group is notched more extensively than an outer shape of the lens barrel, like an invention as described in Japanese Patent Application Publication No. 2000-098272 or Japanese Patent No. 3121843. Accordingly, an irregularity in an illuminance of illuminated light on a reflective image displaying element may readily be caused to degrade a quality of a projection image.

SUMMARY OF THE INVENTION

According to one aspect of the present invention, there is provided an image displaying apparatus including a light source, a light condenser for condensing light emitted from the light source to form a condensed light image at a predetermined position, a light mixing element having an entrance end near the condensed light image, a reflective image displaying element having plural micro-mirrors arranged two-dimensionally and configured to change an inclination angle of an individual micro-mirror between an on-state and an off-state so that emission of reflected light turns on or off, an illumination optical system including a condenser lens and a mirror for illumination arranged between an exit end of the light mixing element and the reflective image displaying element, and a projection optical system for projecting, onto a surface to be projected, reflected light from a micro-mirror being at an on-state among plural micro-mirrors constituting the reflective image displaying element, wherein the mirror for illumination is arranged at a position nearest the reflective image displaying element on an optical path from the light mixing element to the reflective image displaying element and a reflection surface of this mirror for illumination is positioned at a side of the reflective image displaying element with respect to a projection lens system constituting a part of the projection optical system.

DETAILED DESCRIPTION OF THE PREFERRED EMBODIMENTS

Figure 1:
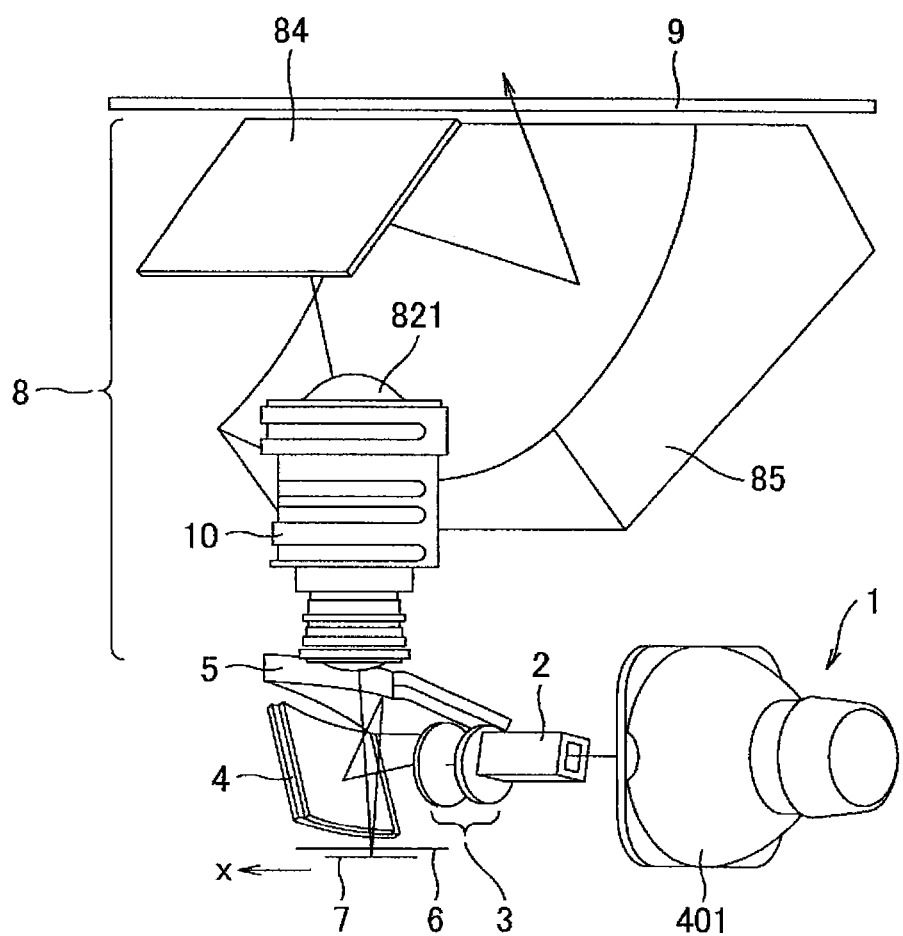
FIG. 1 is a side view of an essential part of practical example 1 of an image displaying apparatus according to an embodiment of the present invention when viewed from one direction.

Practical examples of an image displaying apparatus according to an embodiment of the present invention will be described with reference to the drawings below. Herein, practical examples illustrated in the drawings have configurations in which a projection optical system is configured and arranged to have a projection lens system and a projection mirror, wherein an optical axis of the projection lens system is arranged to be parallel to a surface to be projected and a light beam transmitting through the projection lens system is reflected by the projection mirror toward the surface to be projected. However, a projection optical system used in an embodiment of the present invention is not limited to one having such a configuration and is also capable of being applied to an image displaying apparatus with a configuration of an optical axis of a projection lens generally opposing a surface to be projected.

Figure 12:
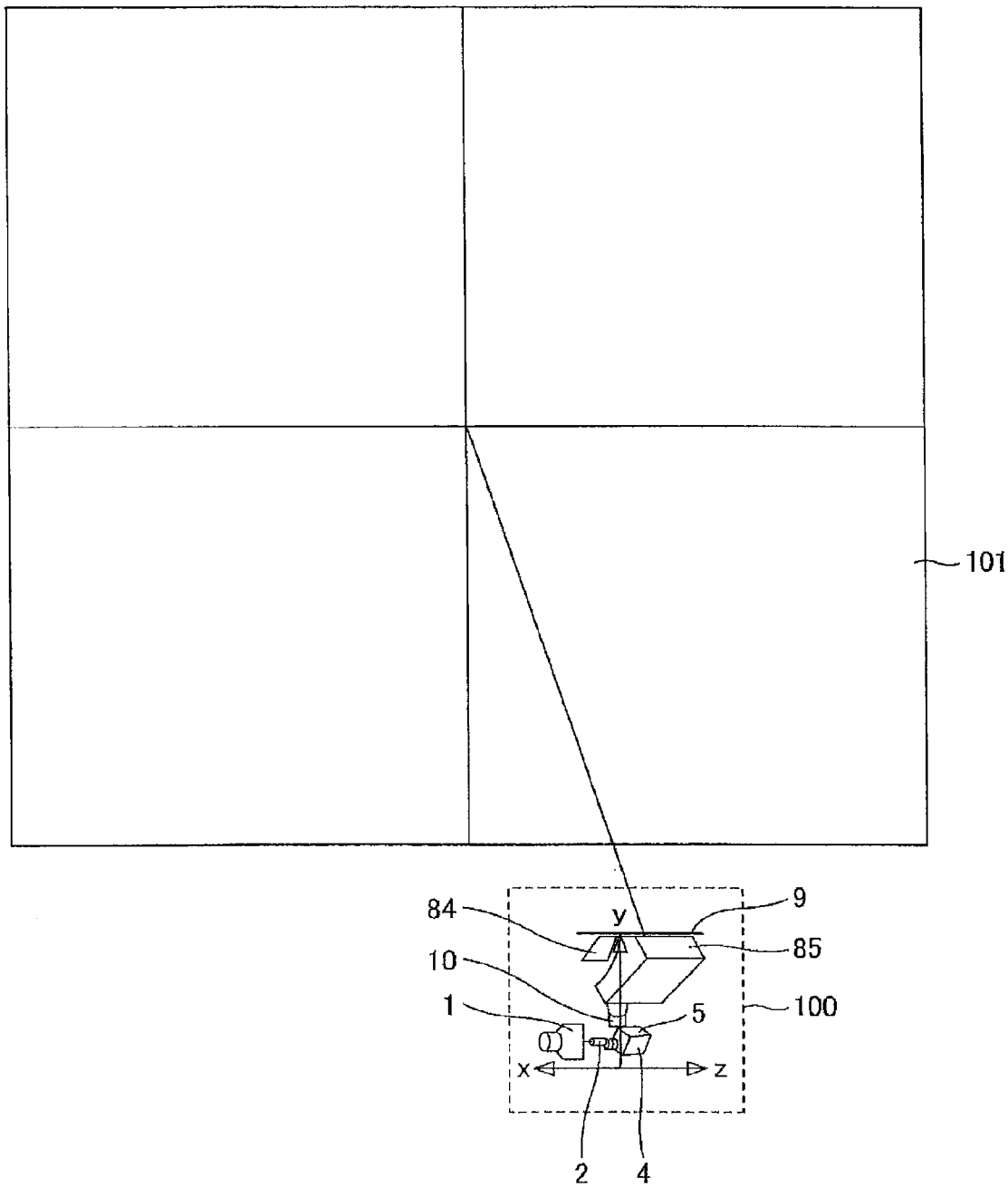
FIG. 12 is an elevation view illustrating a relationship between a practical example of an image displaying apparatus according to an embodiment of the present invention and a surface to be projected.
Figure 13:
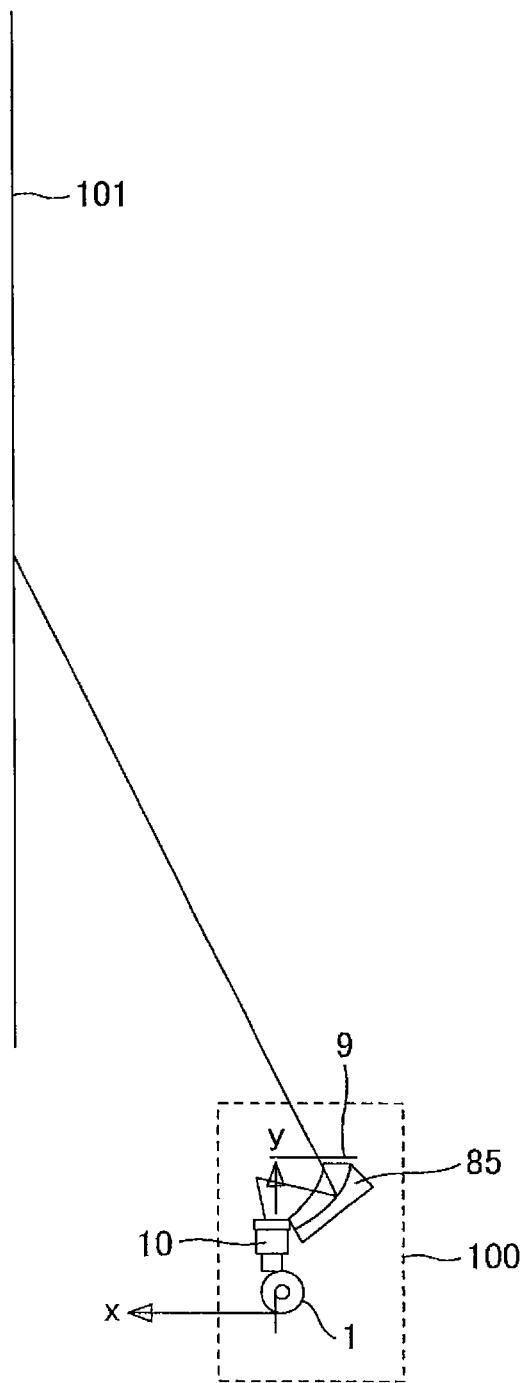
FIG. 13 is a side view illustrating a relationship between a practical example of an image displaying apparatus according to an embodiment of the present invention and a surface to be projected.

First, an outline of an image displaying apparatus according to the present practical example will be described with reference to FIG. 12 and FIG. 13. In FIG. 12 and FIG. 13, reference numerals 100 and 101 denote an image displaying apparatus and a screen or a surface to be projected, respectively. An absolute coordinate system in the present practical example is provided in such a manner that its origin is a center of a reflective image displaying element as described below, while an x-axis is in one direction in a horizontal plane, a z-axis is in one direction in the horizontal plane being orthogonal thereto, and a y-axis is an axis in a vertical direction orthogonal to the x-axis and the z-axis. Members composing an image displaying apparatus 100 represented in FIG. 12 and FIG. 13 includes a light source 1, a light condenser for condensing light emitted from the light source 1 to form a condensed light image at a predetermined position, a light mixing element 2 having an entrance end near the condensed light image, a first mirror for illumination 4, a second mirror for illumination 5, a lens barrel 10 for holding a projection lens system, a first projection mirror 84 composing a projection optical system together with the projection lens system, a second projection mirror 85, and a flat glass plate 9.

The light source 1 and a light condenser thereof, the light mixing element 2, the first mirror for illumination 4, and the second mirror for illumination 5 constitute an illumination optical system, which is configured to homogenously illuminate a reflection surface of a reflective image displaying element that is not shown in the figures. The reflective image displaying element is composed of a DMD as described above and is configured to project reflected light corresponding to an image displayed on the DMD onto a surface to be projected 101 through a projection lens system in the lens barrel 10 composing a projection optical system and the first and second projection mirrors 84 and 85. An optical axis of the projection lens system is directed in a vertical direction on the y-axis and the surface to be projected 101 is also placed in the vertical direction parallel to the optical axis of the projection lens system. The image displaying apparatus 100 is present under a lower end of the surface to be projected 101 and is configured to emit projection light obliquely upward toward the surface to be projected 101 which is provided obliquely upward. In order to correct distortions on the top, bottom, left and right of an image emitted obliquely upward toward the surface to be projected 101 and projected onto the surface to be projected 101, a reflection surface of the second projection mirror is formed of a free-form surface.

PRACTICAL EXAMPLE 1

Figure 2:
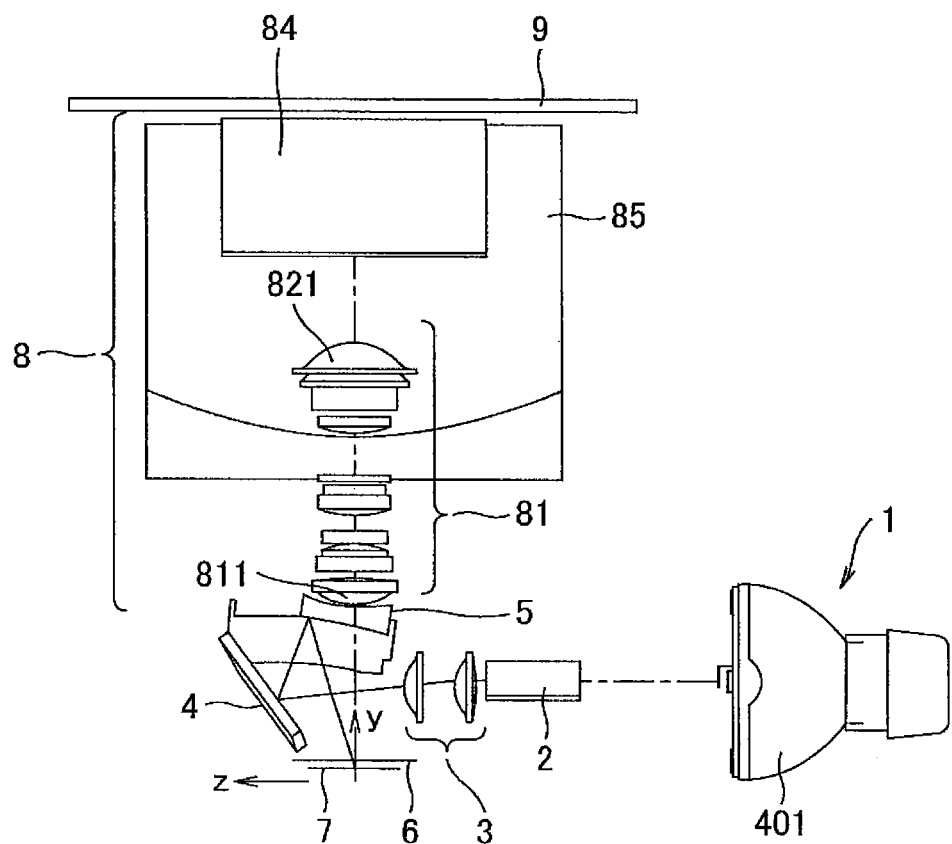
FIG. 2 is a side view of an essential part of practical example 1 described above when viewed from another angle.
Figure 15:
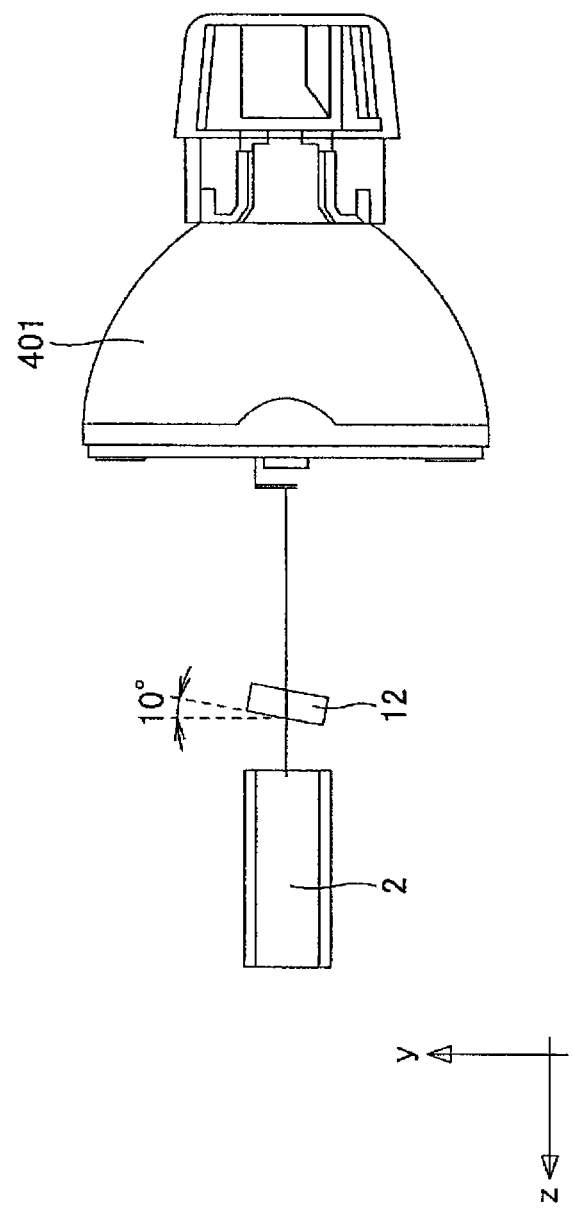
FIG. 15 is a side view illustrating an example of arrangement of optical components between a light source and a light mixing element in an image displaying apparatus according to an embodiment of the present invention.

The configuration of the image displaying apparatus 100 will be described more specifically. FIG. 1 and FIG. 2 illustrate the configuration of the image displaying apparatus including an illumination optical system and a projection optical system while a viewing direction is changed therebetween. In FIG. 1 and FIG. 2, a light source 1 internally includes a luminous body composed of a xenon lamp, a mercury lamp, a metal halide lamp, or the like. Illumination light emitted from the luminous body is condensed at a predetermined position by a light condensing mirror provided inside a reflector 401. A lamp cover that is not illustrated in the figures is attached to a front portion of the light source 1. As illustrated in FIG. 15, an explosion-proof glass 12 is arranged at a front face of the lamp cover and inclined by an angle of 10 degrees with respect to an optical axis of the luminous body (a direction of a z-axis in an absolute coordinate system).

In FIG. 1 and FIG. 2, a light mixing element 2 is arranged on an optical path of illumination light emitted from the light source 1 and an entrance end of the light mixing element 2 is positioned near the position of a focus of the illumination light. For the light mixing element 2, a well-known light tunnel having a rectangular aperture is used in the present practical example. For the light tunnel, four plate-shaped mirrors are combined to form a square or rectangular column while reflection surfaces are provided inward. The position of a focus of the illumination light is present near one end of the light tunnel whereby the illumination light is incident on the light tunnel. Reflection of the incident light is repeated by the inner surfaces of the four mirrors, and illumination light with a homogenized illuminance distribution and a cross section having a rectangular shape is emitted from the other end or exit end of the light tunnel. For the light mixing element 2, a publicly known rod integrator, light pipe, or the like, other than a light tunnel may be used.

On the pathway of illumination light emitted from the light mixing element 2, a condenser lens 3, a first mirror for illumination 4, and a second mirror for illumination 5 are arranged in such an order. The condenser lens 3 and the first mirror for illumination 4 are provided on a generally straight pathway of illumination light emitted from the light mixing element 2. The first mirror for illumination 4 is placed to fold illumination light emitted from the condenser lens 3 diagonally backward and upward and to have a diagonally upward orientation that is inclined with respect to both a direction of the x-axis and a direction of the z-axis. The second mirror for illumination 5 is placed to fold reflected light from the first mirror for illumination 4 downward and forward and toward a DMD 7 that is a reflective image displaying element placed downward and to have a diagonally downward orientation that is inclined with respect to both a direction of the x-axis and a direction of the y-axis.

Thus, illumination light transmits through the condenser lens 3 and is reflected by the first mirror for illumination 4 and the second mirror for illumination 5 in order, whereby a cross section of the illumination light is shaped appropriately, and the illumination light reflected from the second mirror 5 for illumination irradiates the DMD 7. A cover glass 6 is arranged at a front surface of the DMD 7. The DMD 7 is generally arranged in a horizontal plane, wherein illumination light irradiated via the second mirror for illumination 5 is reflected upwardly in a vertical direction when micro-mirrors possessed by the DMD 7 turn on. An exit end of the light mixing element 2 and the under-mentioned micro-mirror surfaces of the DMD 7 are provided at conjugate positions with respect to an illumination optical system composed of the condenser lens 3, the first mirror for illumination 4, and the second mirror for illumination 5, wherein micro-mirror surfaces of the DMD 7 are uniformly irradiated with illumination light that is uniform at an exit end of the light mixing element 2.

As described above, illumination light is three-dimensionally reflected several times from the condenser lens 3 through the first mirror for illumination 4, the second mirror for illumination 5, and the DMD 7 to a projection optical system 8. The first mirror for illumination 4 and the second mirror for illumination 5 are inclined with respect to directions of the x-axis and the y-axis so that illumination light is not interfered by each component described above in that period, and arranged around a projection lens 81 and centered at an optical axis thereof when viewed from a planar direction.

The specification of components of an optical system of the light source 1 through the DMD 7 and the coordinates of the position of each optical component are presented in Table 1 and Table 2, respectively. In Table 1 and Table 2, "Lamp 1" refers to the light source 1. Furthermore, "Lens 1" and "Lens 2", and "First mirror 4" and "Second mirror 5" designate a first lens and a second lens which constitute the condenser lens 3, and the first mirror for illumination 4 and the second mirror for illumination 5, respectively.

TABLE 1

* Specification of components of an illumination system

| Lamp 1 | Light converging (full) angle | (59.5°) | |
|---|---|---|---|
| Light tunnel 2 | Aperture size | 5.7 × 3.4 mm | |
| | Length | 25 mm | |
| Lens 1 | Radius of curvature at entrance side $R_1$ | 36.05 mm | *Entrance surface: spherical surface |
| | Radius of curvature at exit side $R_2$ | −10.00 mm | * Exit surface: aspherical surface |
| | Aspherical coefficient $c_{04}$ | 1.81956E−05 | |
| | Aspherical coefficient $c_{06}$ | 2.54925E−06 | |
| | Aspherical coefficient $c_{08}$ | −2.42823E−09 | |

TABLE 1-continued

*Specification of components of an illumination system*

| | | | |
|---|---|---|---|
| | Aspherical coefficient $c_{10}$ | −1.45189E−10 | |
| | Aspherical coefficient $c_{12}$ | 1.54226E−13 | |
| | Aspherical coefficient $c_{14}$ | 4.34653E−14 | |
| | Central thickness | 6.3 mm | |
| | Refractive index nd | 1.51473 | |
| | Abbe number vd | 63.86 | |
| Lens 2 | Radius of curvature at entrance side $R_1$ | 209.10 mm | *Entrance surface: spherical surface |
| | Radius of curvature at exit side $R_2$ | −13.84 mm | *Exit surface: aspherical surface |
| | Aspherical coefficient $c_{04}$ | −1.2428306E−05 | |
| | Aspherical coefficient $c_{06}$ | 5.2759745E−08 | |
| | Aspherical coefficient $c_{08}$ | 1.1041945E−10 | |
| | Aspherical coefficient $c_{10}$ | 1.4179450E−11 | |
| | Aspherical coefficient $c_{12}$ | 3.2988440E−13 | |
| | Aspherical coefficient $c_{14}$ | 7.7405353E−15 | |
| | Central thickness | 5.0 mm | |
| | Refractive index nd | 1.51473 | |
| | Abbe number vd | 63.86 | |
| First mirror 4 | Radius of curvature $R_x$ | −475 mm | *cylindrical surface (concave surface) *Reflection surface: silver coat |
| | Radius of curvature $R_y$ | ∞ | |
| First mirror 5 | Radius of curvature R | −78 | *Spherical surface (concave surface) *Reflection surface: silver coat |
| Cover glass 6 | Radius of curvature R | ∞ | *Planar surface |
| | Central thickness | 1.05 mm | |
| | Refractive index nd | 1.5168 | |
| | Abbe number vD | 64.1 | |
| DMD 7 | Dimension (longitudinal direction) | 13.824 mm | *Pixel size: □10 μm |
| | Dimension (transverse direction) | 8.64 mm | |
| | Number of pixels (longitudinal direction) | 1280 | |
| | Number of pixels (transverse direction) | 800 | |
| | Pitch of pixels | 10.8 μm | |

*1: Aspherical coefficients other than those described in the above table are all zero.

TABLE 2

*Coordinates of arrangement*

| | | |
|---|---|---|
| Light tunnel 2 (center of aperture at exit end) | x | −5.481 |
| | y | 22.88 |
| | z | −34.528 |
| | γ | 9.75 |
| Lens 1 (apex of entrance surface) | x | −7.191 |
| | y | 21.16 |
| | z | −31.839 |
| Lens 2 (apex of entrance surface) | x | −7.191 |
| | y | 21.16 |
| | z | −17.743 |
| First mirror 4 (apex of reflection surface) | x | −11.48 |
| | y | 17 |
| | z | 20.366 |
| | α | −36.03 |
| | β | −2.03 |
| | γ | 18 |
| Second mirror 5 (apex of reflection surface) | x | −15.191 |
| | y | 36.16 |
| | z | 11.556 |
| | α | 94.2 |
| | β | 17.8 |
| | γ | 0 |
| Cover glass 6 (center at DMD side) | x | 0 |
| | y | 1.075 |
| | z | 0 |
| | α | 0 |
| | β | 0 |
| | γ | 0 |
| DMD 7 (position of center) | x | 0 |
| | y | 0 |
| | z | 0 |

*1: Units of x, y, and z are [mm] and those of α, β, and γ are [deg].
*2: Rotation about the x-axis is ... α, rotation about the y-axis is ... β, and rotation about the z-axis is ... γ.
*3: An order of rotation is α → β → γ.
*4: Rotation of a right-handed screw for α or β is negative and Rotation of a right-handed screw for γ is positive.
*5: There is no rotation for Lens 1 or Lens 2.

Figure 16:
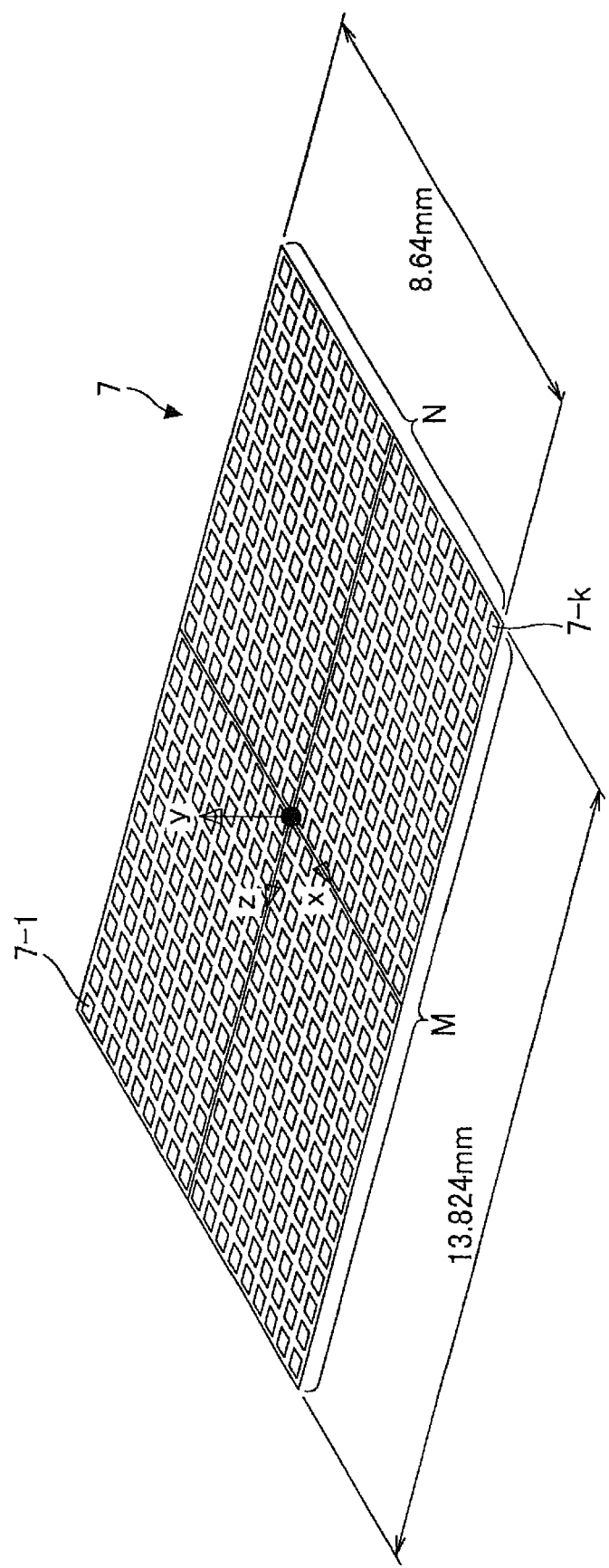
FIG. 16 is a perspective view illustrating an example of arrangement of micro-mirrors of a DMD as a reflective image displaying element in the practical example as described above.

The DMD 7 which is a reflective image displaying element has micro-mirrors 7-1 to **7-*k* arranged two-dimensionally as illustrated in FIG. 16. It is possible for each micro-mirror to change its inclination independently, so that the angle of reflection of light incident in a predetermined direction and at a predetermined angle is changed to make an on-state or an off-state. The angle of deflection of each micro-mirror is approximately ±12°. Such an on-state and an off-state refer to, for example, a state in which reflected light is incident on a subsequent optical system and a state in which reflected light deviates from a subsequent optical system, respectively. The DMD 7** in the present practical example is composed of micro-mirrors, wherein the number M of the micro-mirrors in a longitudinal direction is M=1280 and the number of the micro-mirrors in a transverse direction is N=800 so that the total number k thereof is k=M×N=1024000. Its aspect ratio is 1280:800=16:10. The interval of arrangement of the respective micro-mirrors (or the pitch of pixels) is 10.8 micron.

The origin of an absolute coordinate system for each optical component constituting the optical system is provided at the center of a reflection surface of the DMD 7, as illustrated in FIG. 1, FIG. 2, FIG. 12, and FIG. 16. The longitudinal direction and transverse direction of the DMD 7 and the normal direction of the DMD 7 are designated as a z-axis, an x-axis, and a y-axis, respectively, while rotations around the x-, y-, and z-axes are denoted as α, β, and γ, respectively. The light axis of illumination light emitted from the light source 1 is provided in the direction of the z-axis. The condenser lens 3 is composed of two lenses ("Lens 1" and "Lens 2" in Table 1 and Table 2), each of which has an aspherical surface at an exit surface, wherein such an aspherical surface is represented by an aspherical surface defined by Mathematical formula 1 and a radius of curvature and aspherical coefficients presented in Table 1. Herein, Z' in a formula for defining an aspherical surface (Mathematical formula 1) is represented by a local coordinate system x', y', and z' whose origin is provided at the apex of an individual lens surface. That is, Z' is an amount of sag of a lens surface.

$$Z'(x', y') = \frac{cr^2}{1 + \sqrt{1 - c^2 r^2}} + \sum_k c_{2k} r^{2k},$$

$$c = \frac{1}{R},$$

$$r = \sqrt{(x')^2 + (y')^2}$$

Mathematical formula 1

Figure 9:
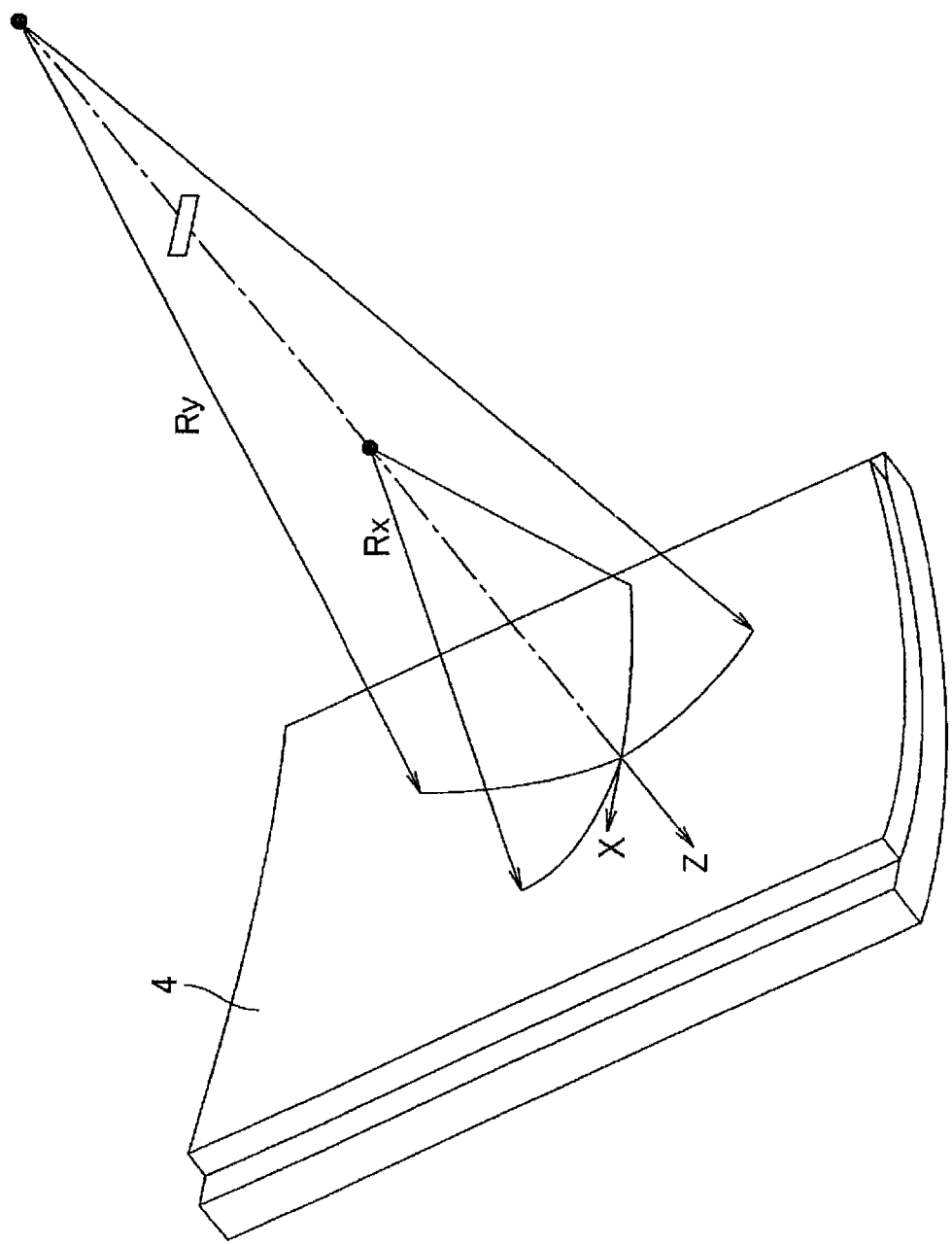
FIG. 9 is a model diagram illustrating a curvature of a first mirror for illumination in practical example 1 described above.

The first mirror for illumination 4 is a mirror having a cylindrical reflection surface and the second mirror for illumination 5 is a concave mirror having a spherical reflection surface. Such a cylindrical surface of the first mirror for illumination 4 is a concave and cylindrical surface with Rx=−475 mm and Ry=∞ (planar surface) wherein a radius of curvature in the direction of the x-axis and a radius of curvature in the direction of the y-axis are denoted by Rx and Ry, respectively, as illustrated in FIG. 9.

A micro-mirror in the on-state of DMD 7 reflects illumination light reflected by the second mirror for illumination 5, toward the projection optical system 8. Light reflected from such a micro-mirror is imaged and projected onto a surface to be projected 101 placed parallel to a plane including the y-axis and the z-axis, by the projection optical system 8. The maximum size of a projected image is 80 inches.

As illustrated in FIG. 1 and FIG. 2, the projection optical system 8 is composed of a projection lens system 81 held by a lens barrel 10 internally, and a projection mirror, wherein the projection mirror is composed of a first projection mirror 84 and a second projection mirror 85. The projection lens system 81 is composed of eleven lenses which are a lens 811 at an entrance end through a lens 821 at an exit end. Table 3 presents data of the projection lens system 81. The lens 811 at an entrance end through the lens 821 at an exit end are designated as "Projection lens 1" through "Projection lens 11" in order. R, d, nd, and vd denote a radius of curvature of a surface corresponding to a surface number, a distance between surfaces adjacent to each other, a refractive index of each lens for D-line, and an Abbe number of each lens.

TABLE 3

| * Projection lend data | | | | | |
|---|---|---|---|---|---|
| Surface number | R | d | nd | vd | Remark |
| 1 | 19.964 | 4.024 | 1.5176 | 63.5 | Projection lens 1 |
| 2 | −194.535 | 0.223 | | | Projection lens 1 |

TABLE 3-continued

| * Projection lend data | | | | | |
|---|---|---|---|---|---|
| Surface number | R | d | nd | vd | Remark |
| 3 | 57.339 | 1.949 | 1.8830 | 40.8 | Projection lens 2 |
| 4 | 12.164 | 6.389 | 1.4875 | 70.4 | Projection lens 3 |
| 5 | −20.746 | 0.333 | | | Projection lens 3 |
| 6 | −59.627 | 7.841 | 1.7306 | 37.6 | Projection lens 4 |
| 7 | 49.429 | 0.605 | | | Projection lens 4 |
| 8 | 19.401 | 6.781 | 1.5810 | 40.9 | Projection lens 5 |
| 9 | −16.196 | 2.210 | 1.9040 | 31.3 | Projection lens 6 |
| 10 | −29.57 | 6.866 | | | Projection lens 6 |
| 11 | −154.02 | 1.822 | 1.5022 | 68.8 | Projection lens 7 |
| 12 | 27.678 | 0.300 | | | Projection lens 7 |
| 13 | 16.284 | 4.695 | 1.7068 | 29.8 | Projection lens 8 |
| 14 | −53.869 | 1.663 | | | Projection lens 8 |
| 15 | −26.356 | 1.800 | 1.9040 | 31.3 | Projection lens 9 |
| 16 | 16.351 | 3.289 | | | Projection lens 9 |
| 17 | −20.191 | 1.800 | 1.5316 | 55.8 | Projection lens 10 |
| 18 | −31.084 | 8.111 | | | Projection lens 10 |
| 19 | −16.01 | 4.125 | 1.5316 | 55.8 | Projection lens 11 |
| 20 | −14.27 | | | | Projection lens 11 |

"Projection lens 1", "Projection lens 10", and "Projection lens 11" in Table 3 described above are lenses whose surfaces at both sides are both aspherical surfaces. The shape of each aspherical surface is represented by a formula of aspherical surface using a local coordinate system as defined by Mathematical formula 1 and Aspherical coefficients presented in Table 4.

TABLE 4

| * Aspherical coefficients of projection lenses | | |
|---|---|---|
| Projection lens 1 | Aspherical coefficient $C_{04}$ | 6.750330E−05 |
| | Aspherical coefficient $C_{06}$ | 2.106239E−07 |
| | Aspherical coefficient $C_{08}$ | 4.589854E−09 |
| | Aspherical coefficient $C_{10}$ | −2.480613E−11 |
| | Aspherical coefficient $C_{12}$ | −1.914714E−13 |
| | Aspherical coefficient $C_{14}$ | 7.962944E−15 |
| | Aspherical coefficient $C_{16}$ | 9.765820E−18 |

TABLE 4-continued

* Aspherical coefficients of projection lenses

| | | |
|---|---|---|
| | Aspherical coefficient $C_{04}$ | 8.850207E−05 |
| | Aspherical coefficient $C_{06}$ | 2.599021E−07 |
| | Aspherical coefficient $C_{08}$ | 2.928829E−09 |
| | Aspherical coefficient $C_{10}$ | 3.664243E−11 |
| | Aspherical coefficient $C_{12}$ | −1.018063E−12 |
| | Aspherical coefficient $C_{14}$ | 1.012708E−14 |
| | Aspherical coefficient $C_{16}$ | 9.188785E−17 |
| Projection lens 10 | Aspherical coefficient $C_{04}$ | 1.291913E−04 |
| | Aspherical coefficient $C_{06}$ | 2.804087E−06 |
| | Aspherical coefficient $C_{08}$ | −1.168735E−07 |
| | Aspherical coefficient $C_{10}$ | 2.477830E−09 |
| | Aspherical coefficient $C_{12}$ | −2.811971E−11 |
| | Aspherical coefficient $C_{14}$ | 1.571829E−13 |
| | Aspherical coefficient $C_{16}$ | −3.346058E−16 |
| | Aspherical coefficient $C_{04}$ | 8.369424E−05 |
| | Aspherical coefficient $C_{06}$ | 2.805544E−07 |
| | Aspherical coefficient $C_{08}$ | −1.645944E−08 |
| | Aspherical coefficient $C_{10}$ | 2.012555E−10 |
| | Aspherical coefficient $C_{12}$ | −6.351043E−13 |
| | Aspherical coefficient $C_{14}$ | −5.562187E−15 |
| | Aspherical coefficient $C_{16}$ | 1.413619E−17 |
| Projection lens 11 | Aspherical coefficient $C_{04}$ | 1.720445E−05 |
| | Aspherical coefficient $C_{06}$ | −1.048542E−06 |
| | Aspherical coefficient $C_{08}$ | 8.610665E−09 |
| | Aspherical coefficient $C_{10}$ | −1.738139E−11 |
| | Aspherical coefficient $C_{12}$ | −7.253682E−14 |
| | Aspherical coefficient $C_{14}$ | −2.849886E−17 |
| | Aspherical coefficient $C_{16}$ | 2.269214E−18 |
| | Aspherical coefficient $C_{04}$ | 2.595314E−05 |
| | Aspherical coefficient $C_{06}$ | −6.354212E−07 |
| | Aspherical coefficient $C_{08}$ | 1.020103E−08 |
| | Aspherical coefficient $C_{10}$ | −1.317664E−10 |
| | Aspherical coefficient $C_{12}$ | 1.166266E−12 |
| | Aspherical coefficient $C_{14}$ | −5.476703E−15 |
| | Aspherical coefficient $C_{16}$ | 1.077343E−17 |

(*1) Aspherical coefficients other than those described in the above table are all zero.

Figure 14:
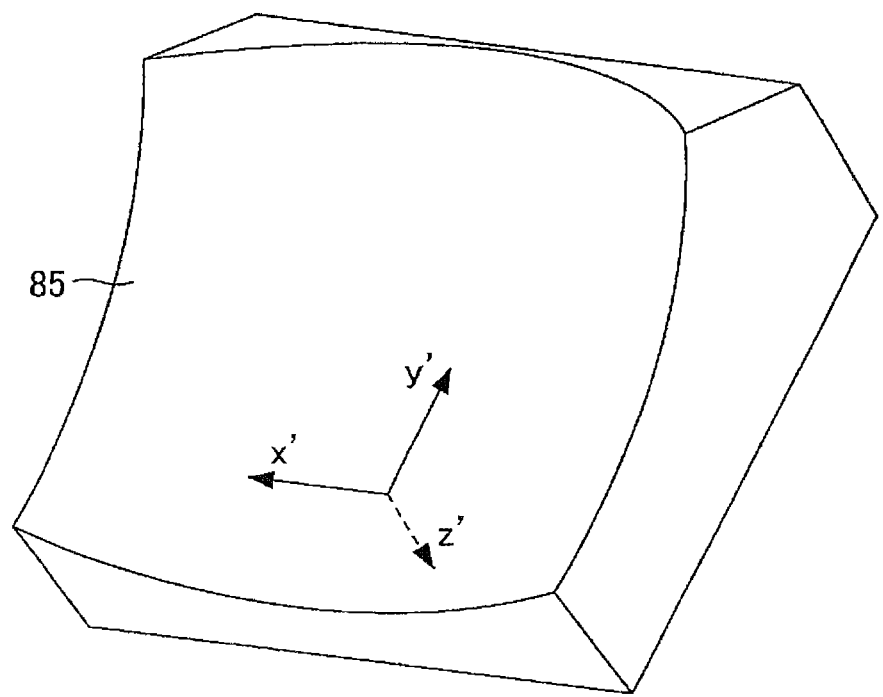
FIG. 14 is a perspective view illustrating a local coordinate system for a second mirror for illumination in the practical example as described above.
Figure 14:
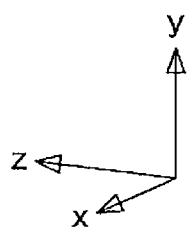

Furthermore, a reflection surface of "Projection mirror 2" corresponding to the second projection mirror 85 is formed to be an aspherical surface represented by using a formula of aspherical surface as defined by Mathematical formula 2 and Aspherical coefficients in Table 5 when local coordinate axes x', y', and z' are provided as illustrated in FIG. 14.

$$z'(x', y') = \frac{cr^2}{1 + \sqrt{1 - c^2 r^2}} + \sum_{k} \sum_{k,j} c_{k,j} (x')^k (y')^j,$$

$$c = \frac{1}{R},$$

$$r = \sqrt{(x')^2 + (y')^2}$$

Mathematical formula 2

TABLE 5

* Specification (2) of components of projection system

| | | | | |
|---|---|---|---|---|
| Projection mirror 2 | Radius of curvature R | ∞ (Planar surface) | Aspherical coefficient $c_{8.3}$ | −2.407368E−18 |
| | Aspherical coefficient $c_{2.0}$ | 5.861136E−03 | Aspherical coefficient $c_{6.5}$ | −9.526972E−19 |
| | Aspherical coefficient $c_{0.2}$ | 2.299409E−03 | Aspherical coefficient $c_{4.7}$ | 3.675664E−18 |
| | Aspherical coefficient $c_{2.1}$ | 3.447998E−05 | Aspherical coefficient $c_{2.9}$ | −5.348885E−18 |
| | Aspherical coefficient $c_{0.3}$ | 3.902694E−06 | Aspherical coefficient $c_{0.11}$ | −8.796724E−19 |
| | Aspherical coefficient $c_{4.0}$ | 2.031034E−07 | Aspherical coefficient $c_{12.0}$ | 1.280434E−20 |
| | Aspherical coefficient $c_{2.2}$ | 4.709163E−07 | Aspherical coefficient $c_{10.2}$ | −3.018432E−20 |

TABLE 5-continued

*Specification (2) of components of projection system*

| | | | |
|---|---|---|---|
| Aspherical coefficient $c_{0,4}$ | 7.126801E−08 | Aspherical coefficient $c_{8,4}$ | −2.294161E−20 |
| Aspherical coefficient $c_{4,1}$ | 4.007452E−09 | Aspherical coefficient $c_{6,6}$ | 1.615774E−19 |
| Aspherical coefficient $c_{2,3}$ | 5.067003E−09 | Aspherical coefficient $c_{4,8}$ | 2.693197E−21 |
| Aspherical coefficient $c_{0,5}$ | −1.490065E−09 | Aspherical coefficient $c_{2,10}$ | 9.864725E−20 |
| Aspherical coefficient $c_{6,0}$ | −1.195799E−10 | Aspherical coefficient $c_{0,12}$ | −8.337776E−21 |
| Aspherical coefficient $c_{4,2}$ | 1.211113E−11 | Aspherical coefficient $c_{12,1}$ | 1.485311E−22 |
| Aspherical coefficient $c_{2,4}$ | −8.261563E−11 | Aspherical coefficient $c_{10,3}$ | 1.098791E−21 |
| Aspherical coefficient $c_{0,6}$ | 1.615799E−10 | Aspherical coefficient $c_{8,5}$ | 5.367361E−22 |
| Aspherical coefficient $c_{6,1}$ | −4.124172E−12 | Aspherical coefficient $c_{6,7}$ | −3.052206E−21 |
| Aspherical coefficient $c_{4,3}$ | −1.810118E−12 | Aspherical coefficient $c_{4,9}$ | 1.632099E−21 |
| Aspherical coefficient $c_{2,5}$ | 3.618342E−12 | Aspherical coefficient $c_{2,11}$ | 2.499589E−22 |
| Aspherical coefficient $c_{0,7}$ | −3.759000E−12 | Aspherical coefficient $c_{0,13}$ | 4.076615E−22 |
| Aspherical coefficient $c_{8,0}$ | 1.030317E−13 | Aspherical coefficient $c_{14,0}$ | −1.423270E−24 |
| Aspherical coefficient $c_{6,2}$ | −3.644868E−14 | Aspherical coefficient $c_{12,2}$ | 5.605448E−24 |
| Aspherical coefficient $c_{4,4}$ | 1.388509E−13 | Aspherical coefficient $c_{10,4}$ | 4.172579E−24 |
| Aspherical coefficient $c_{2,6}$ | −2.148588E−14 | Aspherical coefficient $c_{8,6}$ | −2.701329E−23 |
| Aspherical coefficient $c_{0,8}$ | −4.698124E−14 | Aspherical coefficient $c_{8,8}$ | 1.125683E−24 |
| Aspherical coefficient $c_{8,1}$ | 3.085129E−15 | Aspherical coefficient $c_{4,10}$ | −4.987119E−23 |
| Aspherical coefficient $c_{6,3}$ | 2.856688E−15 | Aspherical coefficient $c_{2,12}$ | −1.758726E−23 |
| Aspherical coefficient $c_{4,5}$ | −1.090944E−15 | Aspherical coefficient $c_{0,14}$ | −3.613684E−24 |
| Aspherical coefficient $c_{2,7}$ | 3.429217E−15 | Aspherical coefficient $c_{14,1}$ | −4.066279E−27 |
| Aspherical coefficient $c_{0,9}$ | 2.390548E−15 | Aspherical coefficient $c_{12,3}$ | −1.931199E−25 |
| Aspherical coefficient $c_{10,0}$ | −4.894122E−17 | Aspherical coefficient $c_{10,5}$ | 3.002305E−27 |
| Aspherical coefficient $c_{8,2}$ | 5.872508E−17 | Aspherical coefficient $c_{8,7}$ | 3.511542E−25 |
| Aspherical coefficient $c_{6,4}$ | −1.117660E−17 | Aspherical coefficient $c_{5,9}$ | 1.893875E−25 |
| Aspherical coefficient $c_{4,6}$ | −2.225495E−16 | Aspherical coefficient $c_{4,11}$ | 3.499850E−25 |
| Aspherical coefficient $c_{2,8}$ | 5.642092E−18 | Aspherical coefficient $c_{2,13}$ | 1.054943E−25 |
| Aspherical coefficient $c_{0,10}$ | 1.647124E−17 | Aspherical coefficient $c_{0,15}$ | 8.602497E−27 |
| Aspherical coefficient $c_{10,1}$ | −1.051485E−18 | | |

(*1) Aspherical coefficients other than those described in the above table are all zero.

Table 6 presents the specification of optical components constituting the projection optical system 8 except the projection lenses and the second projection mirror 85. In Table 6, "Projection mirror 1" corresponds to the second projection mirror 84. "Stop 1", "Stop 2", or "Stop 3" is not illustrated in the figure.

TABLE 6

*Specification of projection system (except lenses)*

| Projection mirror 1 | Radius of curvature R | ∞ (Planar surface) |
|---|---|---|
| Flat glass plate 9 | Radius of curvature R | ∞ (Planar surface) |
| | Center thickness | 3.00 mm |
| | nd | 1.5168 |
| | νd | 64.2 |
| Stop 1 | Stop diameter | 15.6 mm |
| Stop 2 | Stop diameter | 14.8 mm |
| Stop 3 | Stop diameter | 18.2 mm |

Table 7 presents coordinates of arrangement of optical components of a projection optical system in the case where the size of an image projected onto a surface to be projected 101 is 43 inches.

TABLE 7

*Coordinates of arrangement of components of projection system (in the case where a size of projection on a screen is 43 inches)*

| | | |
|---|---|---|
| Projection lens 1 (apex of entrance surface) | X | 6.340 |
| | Y | 44.160 |
| | Z | 0 |
| Projection mirror 1 (reflection surface) | X | 6.340 |
| | Y | 170.569 |
| | Z | 0 |
| | α | 0 |
| | β | −90 |
| | γ | 45 |
| Projection mirror 2 (origin of local coordinate of reflection surface) | X | −48.660 |
| | Y | 105.269 |
| | Z | 0 |
| | α | −90 |
| | β | 39.7 |
| | γ | 90 |
| Flat glass plate 9 | X | −48.660 |
| | Y | 173.569 |
| | Z | 0 |
| Screen | X | 136 |
| | Y | 595 |
| | Z | 0 |
| | α | 0 |
| | β | −90 |
| | γ | 0 |
| Stop 1 | X | 6.340 |
| | Y | 48.184 |
| | Z | 0 |
| Stop 2 | X | 6.340 |
| | Y | 81.382 |
| | Z | 0 |

TABLE 7-continued

| * Coordinates of arrangement of components of projection system (in the case where a size of projection on a screen is 43 inches) | | |
| --- | --- | --- |
| Stop 3 | X | 6.340 |
| | Y | 83.504 |
| | Z | 0 |

*1: Units of x, y, and z are [mm] and those of α, β, and γ are [deg].
*2: Rotation about the x-axis is . . . α, rotation about the y-axis is . . . β, and rotation about the z-axis is . . . γ.
*3: An order of rotation is α → β → γ.
*4: Rotation of a right-handed screw for α or β is negative and Rotation of a right-handed screw for γ is positive.
*5: α = 90 and β = γ = 0 for all of lenses 1-11 and the flat plate.

In FIG. 1 and FIG. 2, a flat glass plate 9 is arranged adjacently to the top ends of the first projection mirror 84 and second projection mirror 85 and parallel to a plane including the x-axis and the z-axis. The image displaying apparatus according to the present practical example is incorporated in a housing that is not illustrated in the figure and the flat glass plate 9 is fit into an aperture of the housing at a top end, whereby dust proofing inside the image displaying apparatus is intended.

Figure 5:
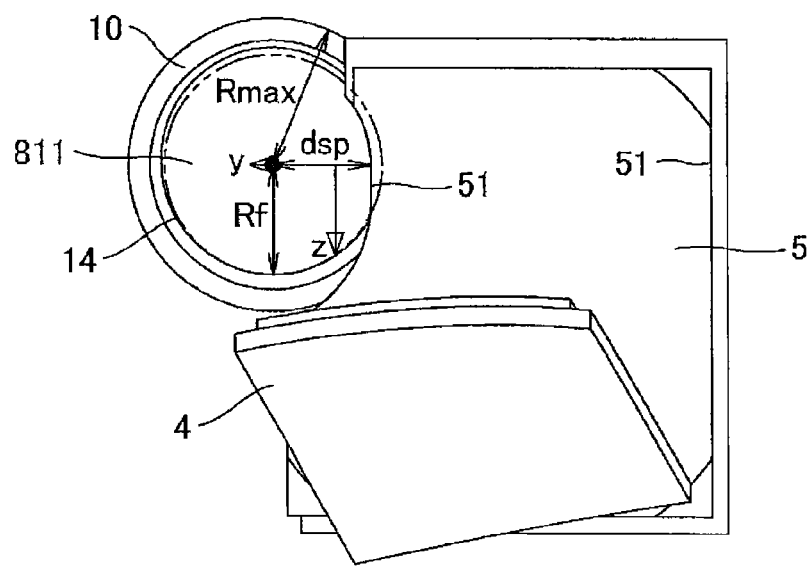
FIG. 5 is an enlarged and bottom view illustrating a mirror for illumination and a lens barrel part for a projection lens as described above.
Figure 6:
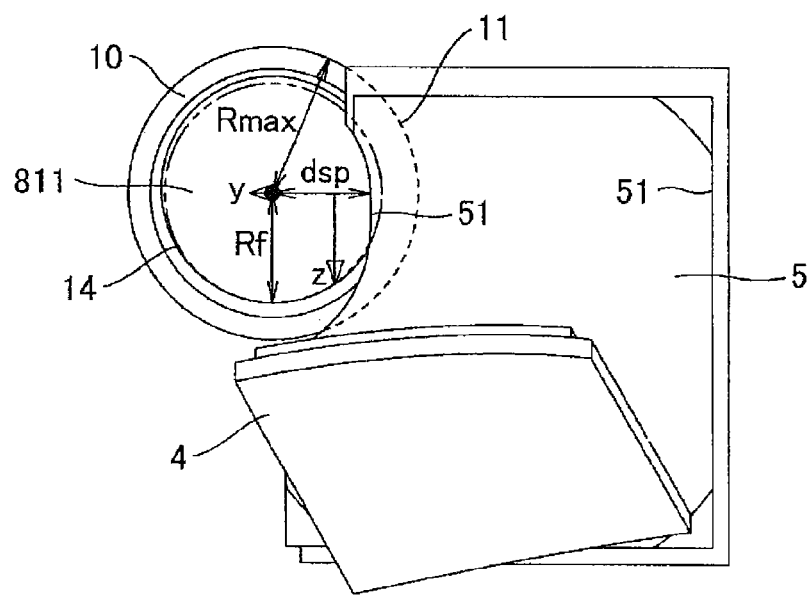
FIG. 6 is an enlarged and bottom view illustrating a mirror for illumination and a lens barrel part for a projection lens as described above.

Next, the illumination optical system, in particular, the relationship of arrangement among the shapes of the first mirror for illumination 4, the second mirror for illumination 5, the projection lens system 81 constituting the projection optical system 8 and its lens barrel 10 will be described in more detail with reference to FIG. 3 to FIG. 6. In FIG. 5 and FIG. 6, the DMD 7 or the cover glass 6 is not drawn to avoid confusion.

In FIG. 3 to FIG. 6, illumination light having a homogenized luminance distribution at an exit end of the light mixing element 2 passes through the optical elements arranged in the order of the condenser lens 3, the first mirror for illumination 4, and the second mirror for illumination 5 to provide irradiation light for the DMD 7. Herein, if a light beam is physically interfered in the middle of an optical path to cause so-called "vignetting", an irregularity in an illuminance on an illumination light irradiated area of the DMD 7 may be produced to cause an irregularity in an illuminance on an image projected onto a surface to be projected, whereby a quality of a projected image may be degraded. On an optical path from an exit end of the light mixing element 2 to the DMD 7, the second mirror for illumination 5 may neighbor the projection lens system 81, and accordingly, the second mirror for illumination 5 may frequently be notched partially so that the second mirror for illumination 5 does not interfere with the lens barrel 10 for the projection lens system 81. Thus, "vignetting" of a light beam may have readily been caused at the notched portion of the second mirror for illumination 5.

However, in the practical example illustrated in the figure, the second mirror for illumination 5 is arranged at a position nearest the DMD 7 on an optical path of the light mixing element 2 to the DMD 7 as a reflective image displaying element and a reflection surface of this mirror for illumination 5 is positioned at a side of the DMD 7 with respect to the projection lens system 81 constituting a part of the projection optical system 8, in order to solve the above-mentioned problem. Such a configuration may be one of the features of the present practical example. A circular arc indicated by a dotted line with reference numeral 15 in FIG. 3 indicates a reflection surface of the second mirror for illumination 5 and its extended line. A reflection surface of the second mirror for illumination 5 is positioned at a side of the DMD 7 with respect to the projection lens system 81 as described above, whereby the second mirror for illumination 5 may not interfere with the projection lens system 81 or its lens barrel 10 even if a reflection surface of the second mirror for illumination 5 is larger.

Figure 10:
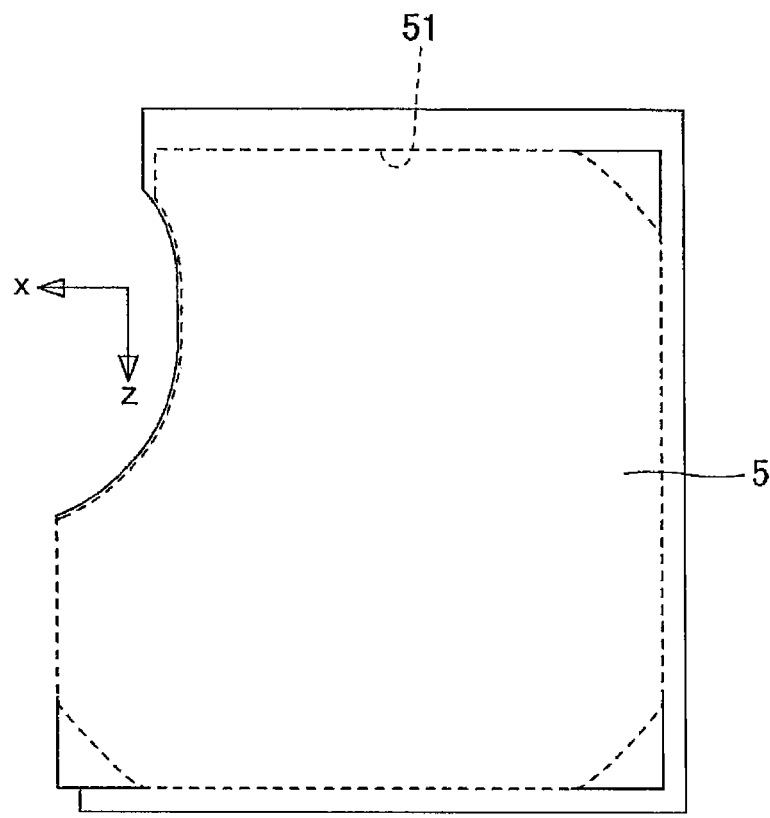
FIG. 10 is an elevation view for illustrating an outer shape and ridge line of a second mirror for illumination in practical example 1 described above.

Moreover, in the present practical example, when the center of the DMD that is a reflective image displaying element and a surface on which the DMD 7 is arranged are an origin and a plane including an x-axis and a z-axis orthogonal thereto, respectively, and the direction of an optical axis of the projection lens system 81 constituting the projection optical system 8, the maximum height of a mirror for illumination (the second mirror for illumination 5 in the present practical example) in the direction of a y-axis, and the maximum size of the lens barrel 10 for holding the projection lens system 81 in the direction of the x-axis or the direction of the z-axis from the optical axis in a range of its entrance end to y=ymax are the y-axis orthogonal to the x-axis and the z-axis, ymax, and Rmax, respectively, a portion of a ridge line of a reflection surface of the second mirror for illumination 5 is positioned between the optical axis of the projection lens system 81 and Rmax as described above. A "ridge line" of a reflection surface as described above refers to a boundary of a projected image produced when a reflection surface of the second mirror for illumination 5 is projected onto a plane including the x-axis and the z-axis. FIG. 10 is a diagram in which a reflection surface of the second mirror for illumination 5 is viewed from the direction of the y-axis and a dotted line 51 indicates a ridge line as described above.

In the present practical example, a y-coordinate of an entrance end of the projection lens barrel 10, the maximum height of the second mirror for illumination 5 in the direction of the y-axis, and the maximum radius of the lens barrel 10 from its optical axis in a range of its entrance end to y=ymax are y=42.13, ymax=46.65 mm, and Rmax=13.2,mm, respectively.

Furthermore, in the present practical example, when the maximum size of a light beam reflected from the DMD 7 and being incident on the projection lens system 81 is Rf, a part of a ridge line 51 as described above is arranged to penetrate into the inside of Rf. In other words, a part of the ridge line 51 on a projection surface of the projection lens system 81 in the direction of an optical axis thereof penetrates into a projection surface of the projection lens system 81. In the present practical example, dsp=8.9 mm, when Rf=10.1 mm and the minimum value of a distance from an optical axis of the projection lens system 81 to the ridge line 51 of a reflection surface of the second mirror for illumination 5 is dsp as illustrated in FIG. 5 and FIG. 6. Because the above-mentioned configuration is included, a uniformity of illuminance on a surface to be irradiated of the DMD 7 may be improved and a quality of an image projected onto a surface to be projected may be improved.

Figure 8:
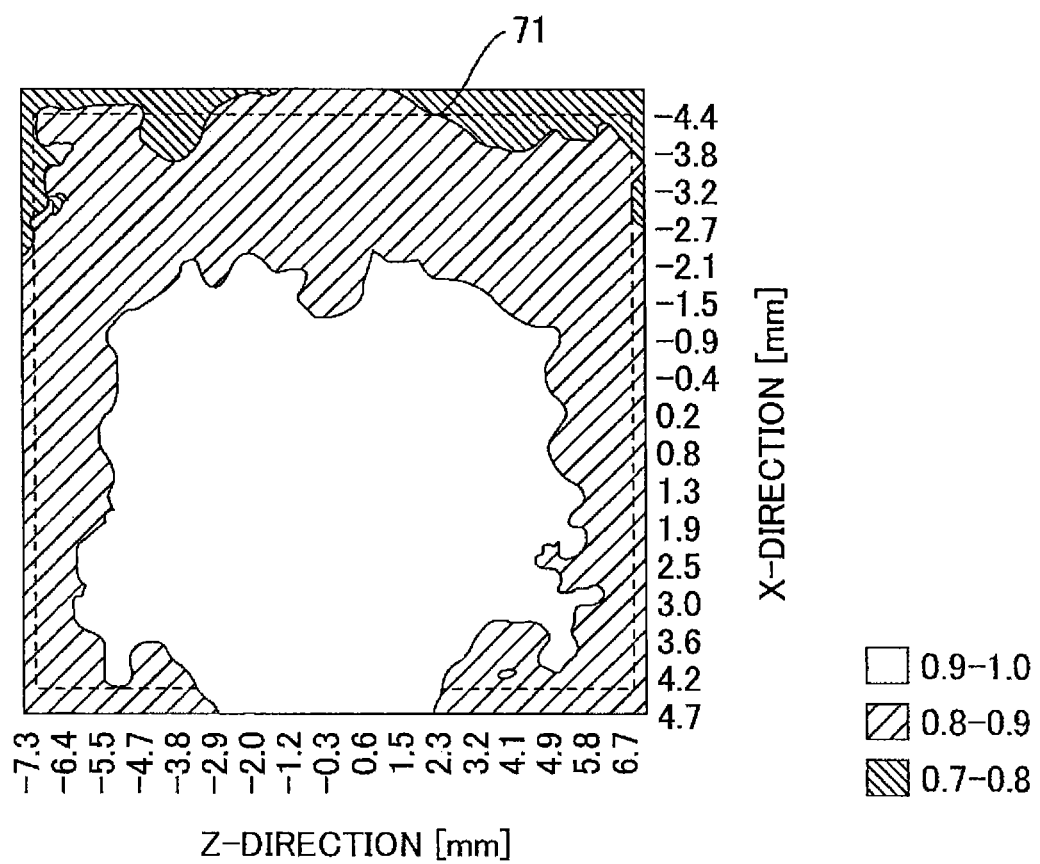
FIG. 8 is a contour map illustrating another example of a distribution of illuminance on a reflective image displaying element in practical example 1 described above.

FIG. 8 illustrates a result obtained by a simulation for an illuminance distribution of illumination light from an optical system for illumination on a reflection surface of the DMD 7 in the configuration of an optical system in the present practical example. For positions in the illuminance distribution of the DMD 7, −Z-direction and +Z-direction correspond to a left direction and a right direction when a surface to be projected (screen) is viewed form a front face, respectively, and −X-direction and +X-direction correspond to a top direction and a bottom direction when a surface to be projected is viewed from a front surface, respectively. In FIG. 8, an area surrounded by a dotted line 71 is an effective area of the DMD 7. An illuminance distribution is displayed while the maximum illuminance in the area is normalized to be 1 or 100%. The minimum value of a normalized illuminance distribution in the effective area is 76% or greater. Meanwhile, a human eye hardly senses a difference of illuminance distribution of 50%, and hence, no problem is provided for the minimum value of 76% in an illuminance distribution as described above.

Figure 7:
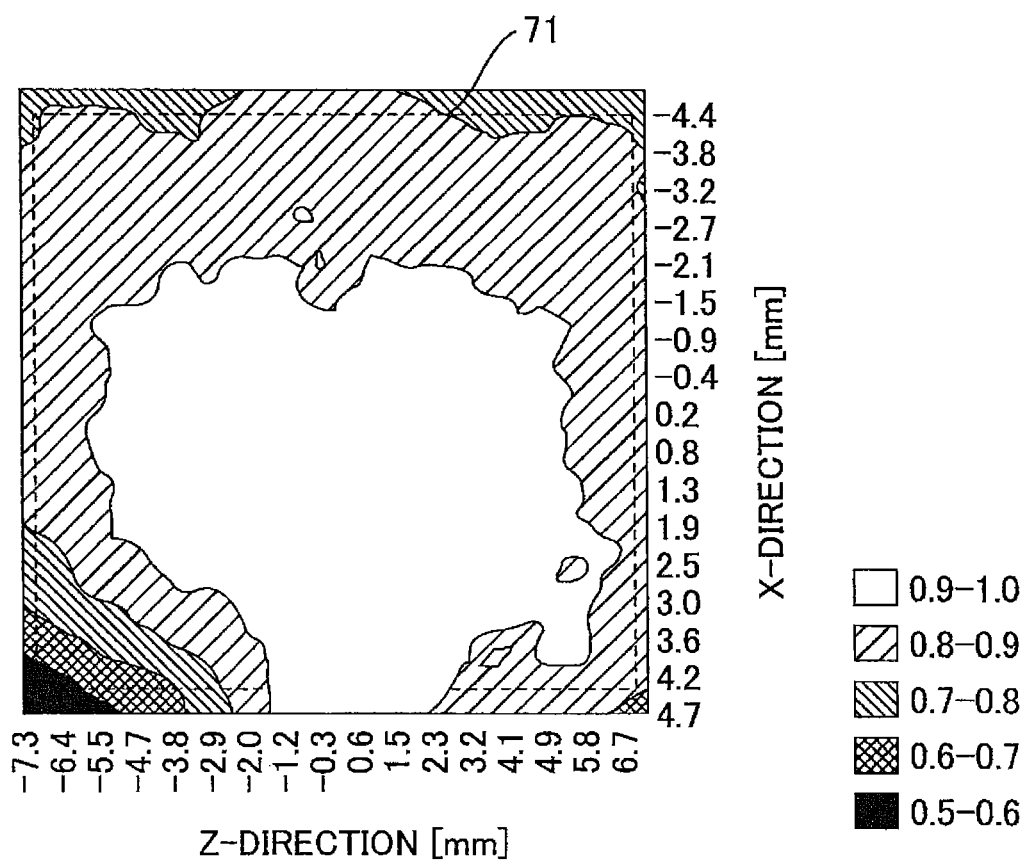
FIG. 7 is a contour map illustrating one example of a distribution of illuminance on a reflective image displaying element in practical example 1 described above.

FIG. 7 illustrates an illuminance distribution on a reflection surface of the DMD 7 in the case where the value of dsp=Rmax+0.5 mm=13.7 mm is provided, that is, the case where a reflection surface of the second mirror for illumination 5 is notched on the maximum radius Rmax of the lens barrel 10 as illustrated by a dotted line 11 in FIG. 6. In this example, a normalized illuminance distribution decreases to 49% on corner portions of an effective area of the DMD 7 at sides of +X and −Z. In this case, a decrease of an illuminance at a bottom left corner is caused, when a surface to be projected is viewed from a front face. However, such a degree of decrease in an illuminance distribution is not problematic practically as described above. In the present practical example, notching of a reflection surface of the second mirror for illumination 5 on the maximum radius Rmax of the lens barrel 10 may be one of the features as described above.

In an image displaying apparatus according to the present practical example, an optical axis of the projection lens system 81 is parallel to the y-axis, that is, parallel to a surface to be projected, as indicated in Table 5, and a flat glass plate 9 for dust proofing is parallel to a plane including the x-axis and the z-axis, that is, is placed in a direction making a right angle with a surface to be projected, as illustrated in FIG. 1 and FIG. 2. Accordingly, a light ray directed to a bottom left or right corner of a surface to be projected among light rays reflected by the second projection mirror 85 of the projection optical system 8 and transmitting through the flat glass plate 9 may have a large angle incident on the flat glass plate 9 and cause a large transmission loss.

Figure 19:
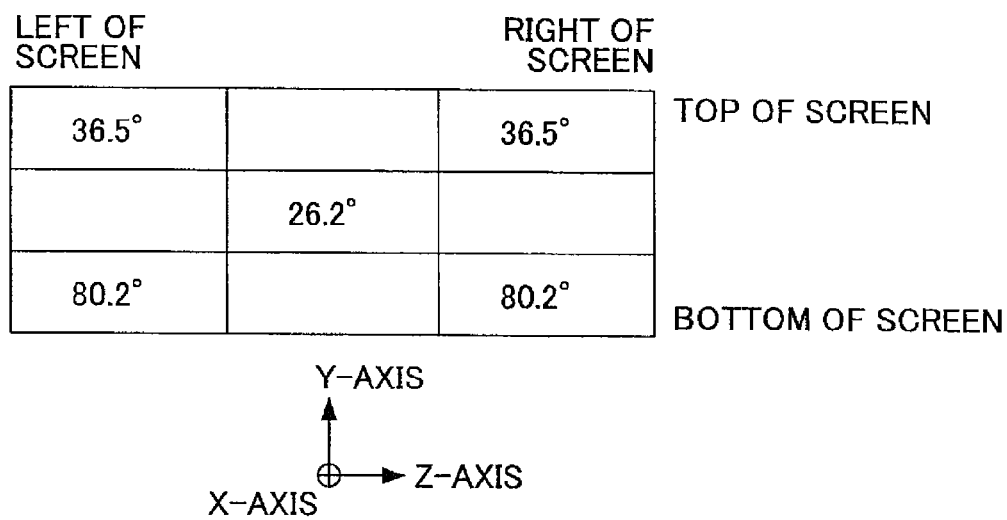
FIG. 19 is a diagram illustrating an angle of incidence from a second projection mirror to a flat glass plate for each divided area of a surface to be projected in a practical example of an image displaying apparatus according to an embodiment of the present invention.

FIG. 19 indicates an angle of incidence on the flat glass plate 9 for a light ray directed to a central part of a surface to be projected and a light ray directed to a top, bottom, left, or right corner of a surface to be projected. An angle of incidence on the flat glass plate 9 has a wide range of less than 20 degrees to about 80 degrees on the entire area of a surface to be projected. The angle of incidence increases with approaching from the center to a bottom left or right corner of a surface to be projected and an incident angle of a light ray directed to a bottom left or eight corner may be 80 degrees or greater. In general, the larger an angle of incidence on or emergence from an optical element is, the lower its transmittance is, and hence, a decrease in an illuminance on a bottom left or right corner of a surface to be projected may readily be caused by a transmission loss of the flat glass plate 9. In particular, a bottom left corner of a surface to be projected may overlap with an area of DMD 7 which involves an illuminance lowered by notching of a reflection surface on the second mirror for illumination 5 as described above, and hence, a decrease in an illuminance on a bottom left corner of the surface to be projected may be large.

The relationship of arrangement between the second mirror for illumination 5 and the projection optical system 8 may be a feature of the present practical example, and thereby, it may be possible to obtain an effect of improving a uniformity of an illuminance distribution on a surface to be projected as described above. Such an effect of improving a uniformity of an illuminance distribution may be more significant when there may be plural factors causing an irregularity in an illuminance as described above.

In the present practical example, when a reflection surface of the second mirror for illumination 5 is brought close to an optical axis of the projection lens system 81, the flatness of an illuminance distribution on the DMD 7 may be improved but an amount of "vignetting" of a light beam reflected from the DMD 7 and being incident on the projection lens system 81 may also increase. Accordingly, if protrusion of a reflection surface of the second mirror for illumination 5 to the projection lens system 81 becomes too large, efficiency of light utilization of an optical system may be reduced.

Figure 20:
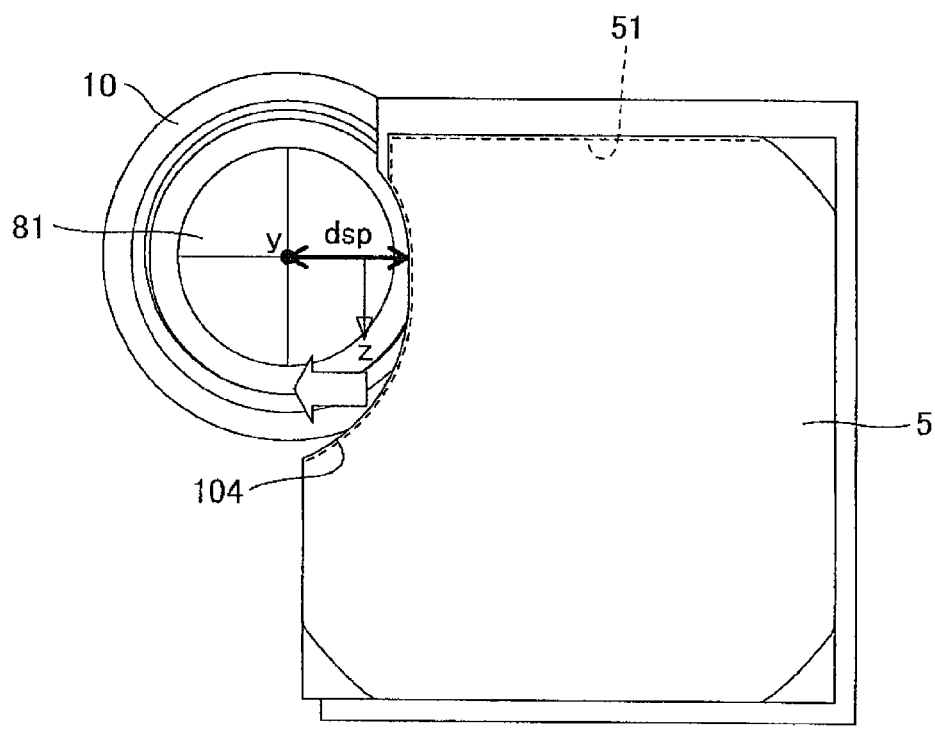
FIG. 20 is a bottom view illustrating a notch of a second mirror for illumination as compared to a projection lens system in a practical example of an image displaying apparatus according to an embodiment of the present invention.

Table 8 indicates a result of calculation of efficiency of light utilization and a normalized illuminance distribution on the DMD 7 when dsp is changed based on a standard that is the case where the minimum value dsp of a distance from an optical axis of the projection lens system 81 to a ridge line 51 of a reflection surface of the second mirror for illumination 5 is dsp=13.7 mm. As illustrated in FIG. 20, the second mirror for illumination 5 is moved in the direction of the x-axis while a shape of a ridge line 104 in a notched portion of its reflection surface is maintained, and illuminance distribution is calculated at each position of dsp=13.7 mm, 10.5 mm, 9.0 mm, 8.0 mm, and 7.0 mm. In Table 8, efficiency of light utilization is normalized such that the case of dsp=13.7 mm is 100%. Furthermore, an illuminance distribution on the DMD 7 is described by sampling Normailized illuminance at positions corresponding to four corners at the top, bottom, left, and right of a surface to be projected.

TABLE 8

| dsp [mm] | Normalized efficiency | Normalized illuminance on DMD (*) | | | |
|---|---|---|---|---|---|
| | | (1) Bottom left | (2) Bottom right | (3) Top left | (4) Top right |
| 13.7 | 100.0% | 49.1% | 85.9% | 76.8% | 76.6% |
| 10.5 | 101.3% | 80.5% | 85.5% | 76.5% | 76.3% |
| 9.0 | 100.6% | 84.4% | 85.5% | 76.5% | 76.3% |
| 8.0 | 98.5% | 85.1% | 85.5% | 76.5% | 76.3% |
| 7.0 | 94.7% | 85.2% | 85.6% | 76.6% | 76.5% |

(*) (1)-(4) are Normalized illuminance on DMD at positions corresponding to the top, bottom, left and right corners of a screen.

As may be seen in Table 8, when dsp decreases, "vignetting" on the second mirror for illumination 5 decreases accordingly, and a Normalized illuminance on the DMD 7 which corresponds to a bottom left corner on a screen increases. On the other hand, with respect to efficiency of light utilization on an optical system, when dsp decreases, such efficiency of light utilization once increases and subsequently (dsp<9) the efficiency of light utilization decreases because "vignetting" of a light beam reflected from the DMD 7 by the second mirror for illumination 5 increases. Hence, when dsp=9 is set as a lower limit, efficiency of light utilization may be prevented from decreasing, and the difference between illuminances at left and right on the DMD 7 which correspond to bottom corners of a surface to be projected may be reduced to 1-2% or less whereby it may be possible to achieve a balance between illuminances at left and right. Herein, the maximum size Rf of a light beam incident on the projection optical system 81 in an optical system in the present practical example is Rf=10.1 mm, and hence, it is found that only dsp/Rf≥9/110.1=0.89 may be needed. When such a configuration is provided, it may be possible to improve a uniformity of an illuminance distribution on a surface on the DMD 7 to be projected, without decreasing efficiency of light utilization on an optical system, and to improve a quality of an image projected to a surface to be projected.

PRACTICAL EXAMPLE 2

Figure 3:
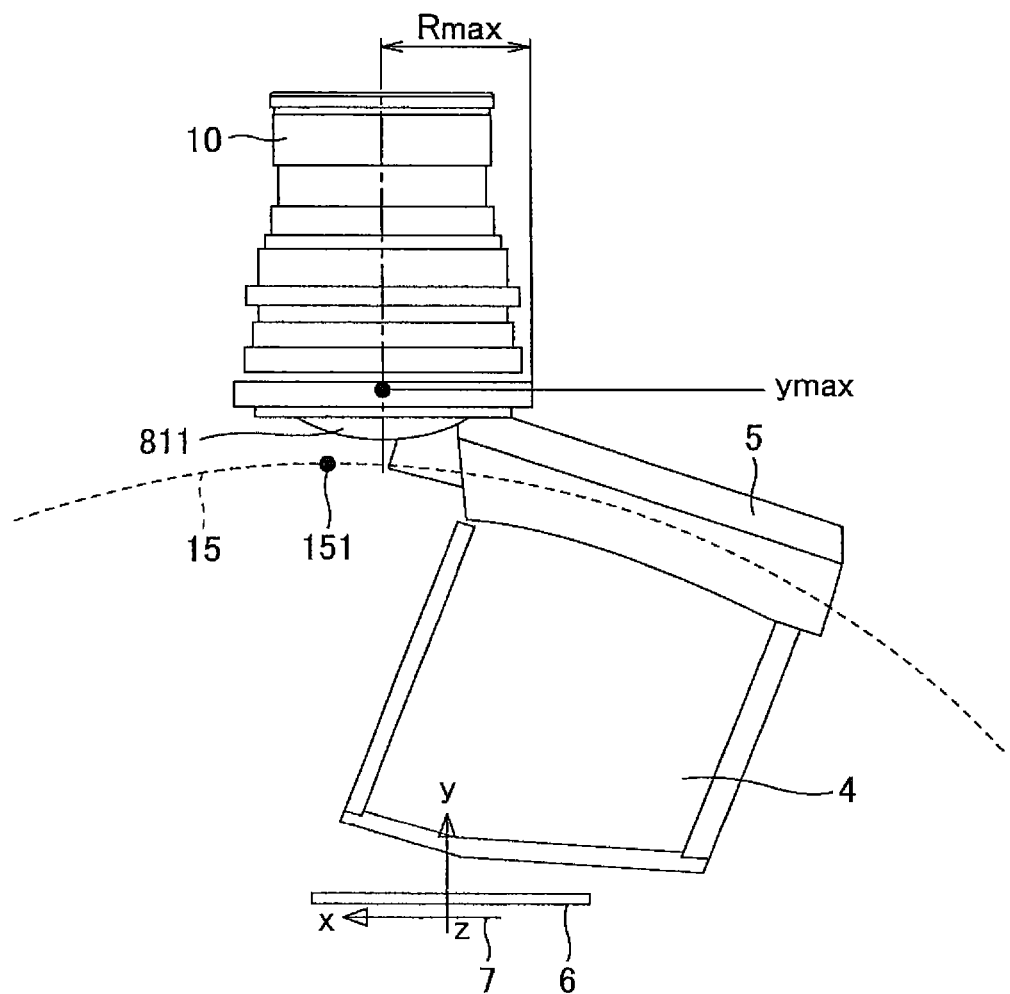
FIG. 3 is an enlarged and side view illustrating a mirror for illumination and a lens barrel part for a projection lens in practical example 1 described above.
Figure 4:
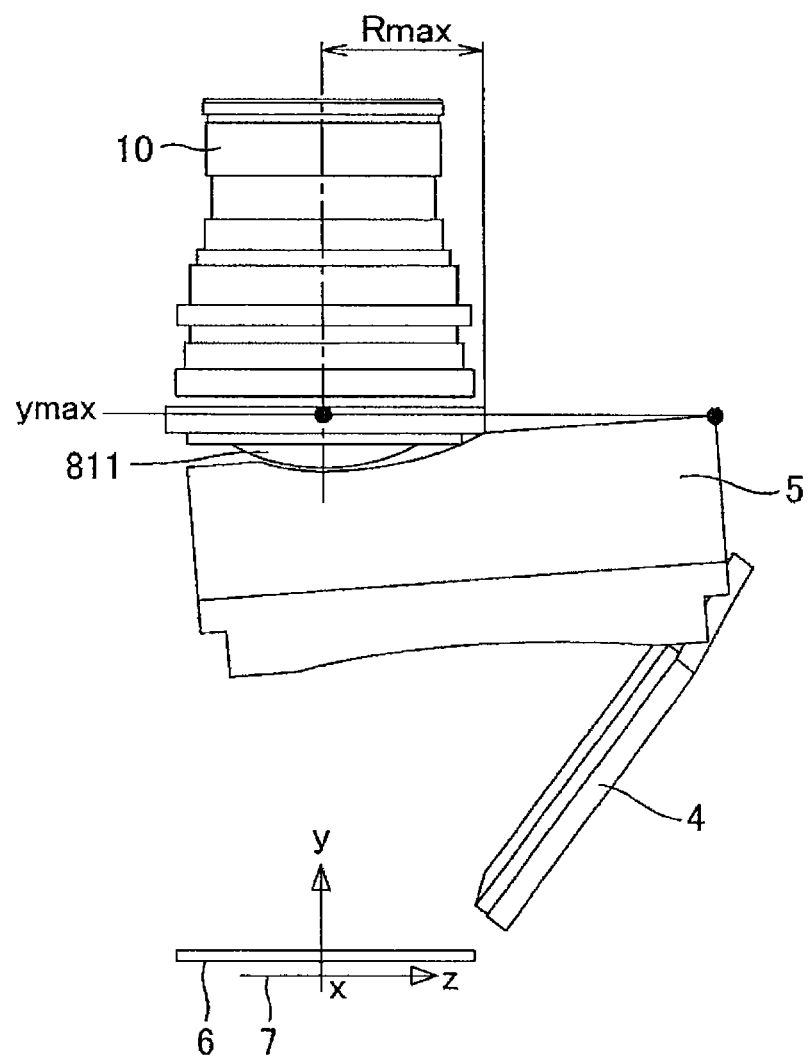
FIG. 4 is a side view illustrating a mirror for illumination and a lens barrel part for a projection lens as described above from another angle.
Figure 17:
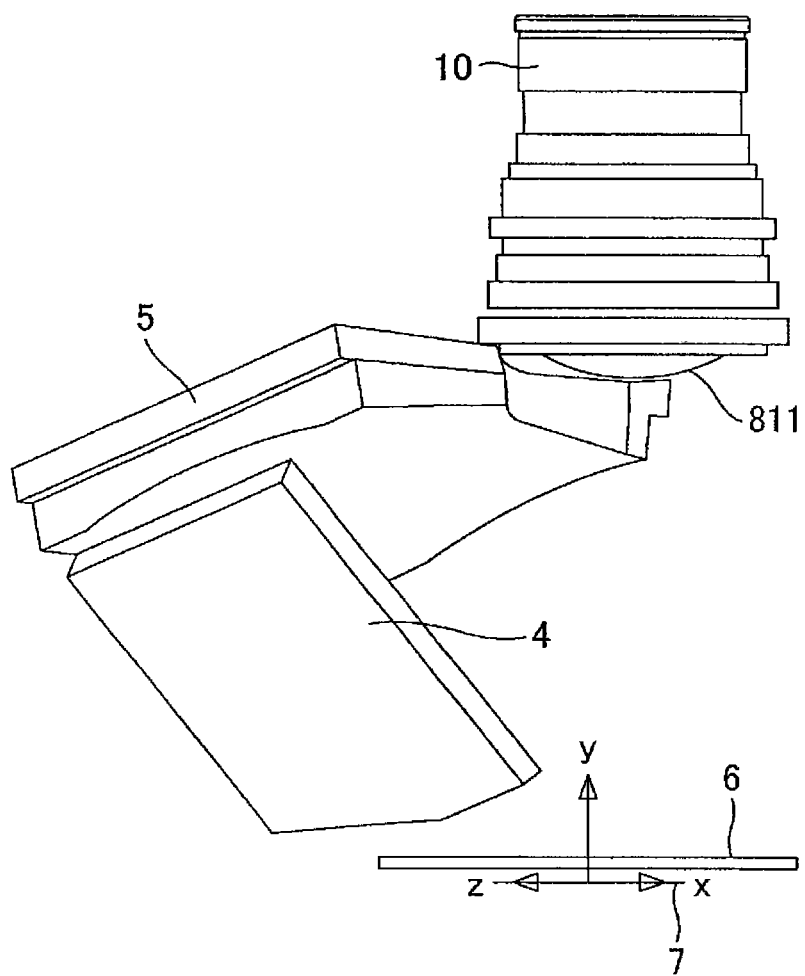
FIG. 17 is a side view illustrating a relationship between a mirror for illumination and a lens barrel for a projection lens in the practical example as described above.

FIG. 17 is an enlarged partial view of the first mirror for illumination 4, the second mirror for illumination 5, a first lens 811 at an entrance side of the projection lens system 81, and the lens barrel for holding the projection lens system 81 in the illumination optical system illustrated in FIG. 3 and FIG. 4 in Practical example 1 described above when viewed from another angle. On the other hand, FIG. 18 is an enlarged partial view of a first mirror for illumination 4, a second mirror for illumination 5, a first lens 811 at an entrance side of a projection optical system 81, and a lens barrel 10 for holding the projection lens system 81 in an illumination optical system in Practical example 2 according to an embodiment of the present invention when viewed from another angle.

Figure 18:
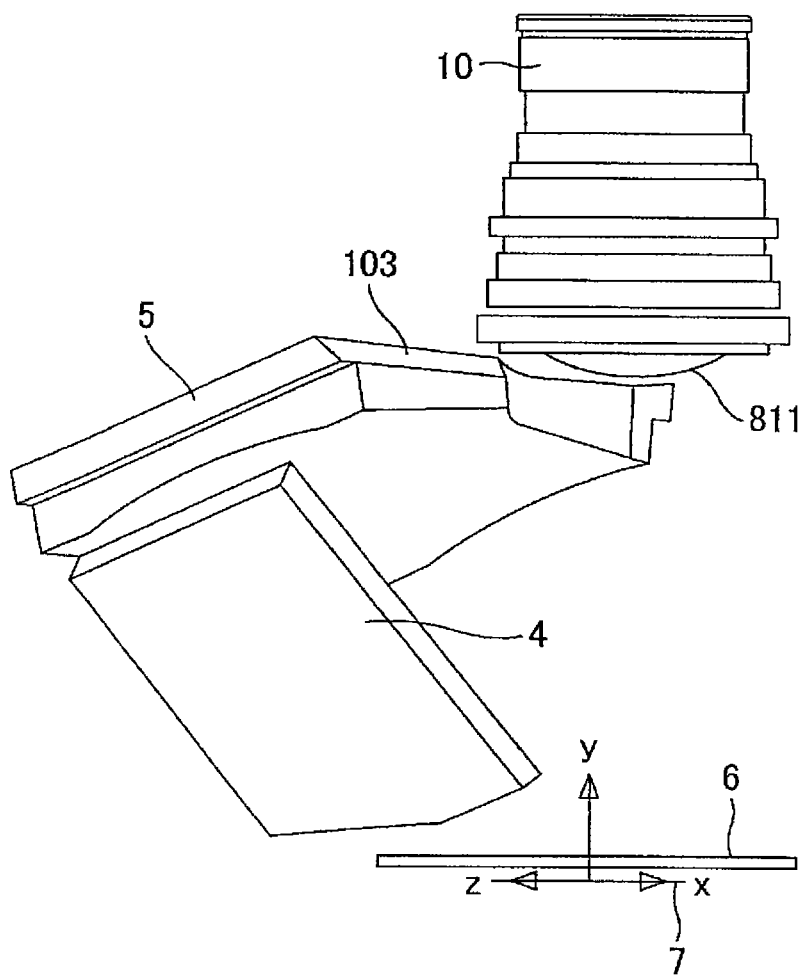
FIG. 18 is a side view illustrating a relationship between a mirror for illumination and a lens barrel for a projection lens in another example of an image displaying apparatus according to an embodiment of the present invention.

In the present Practical example 2, beveling 103 is applied to an edge of the second mirror for illumination 5 at a side of the projection lens system as illustrated in FIG. 18. Due to application of such beveling 103, it may be possible to avoid interference, or reduce the degree of interference caused, between the second mirror for illumination 5 and the lens barrel 10, and additionally, it may be possible to ensure a widely effective area in a reflection surface of the second mirror for illumination 5 because it may be possible to bring the second mirror for illumination 5 closer to an optical axis of the projection lens system. Thereby, it may be possible to improve a uniformity of illuminance distribution on a surface of a DMD 7 to be projected by illumination light and further a uniformity of an illuminance distribution on a surface to be projected, and accordingly, improve a quality of an image projected on a surface to be projected.

PRACTICAL EXAMPLE 3

Figure 11:
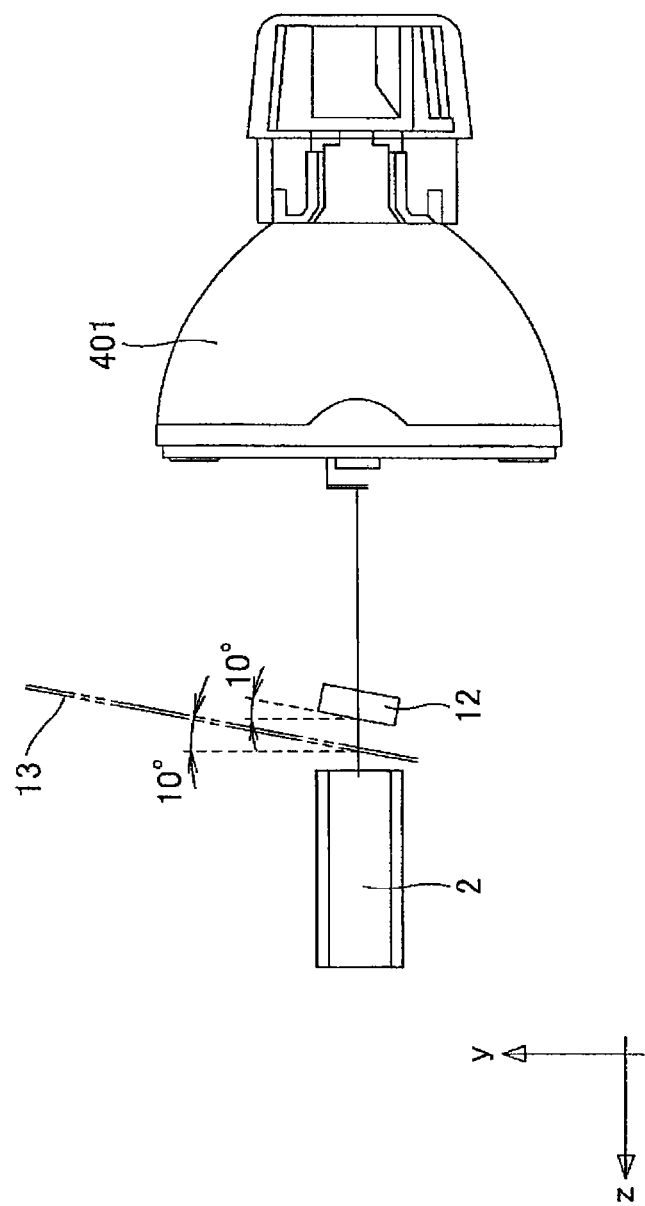
FIG. 11 is a side view illustrating an example of arrangement of optical components between a light source and a light mixing element in an image displaying apparatus according to an embodiment of the present invention.

FIG. 11 illustrates arrangement of components between light source and a light mixing element 2 which may be characteristic parts of Practical example 3 according to an embodiment of the present invention. As illustrated in FIG. 11, a color wheel 13 is arranged adjacent to an entrance end of the light mixing element 2 and an explosion-proof glass 12 between such an entrance end of the light mixing element 2 and the explosion-proof glass 12 in the present practical example. The color wheel 13 is arranged to be inclined by 10° with respect to an optical axis of a light source (in the direction of a z-axis in the figure) similarly to the explosion-proof glass 12.

The color wheel 13 is a well-known optical filter in which annular portions are divided into three primary colors (red (R), green (G), and blue (B)) or divided into the above-mentioned red, green, and blue as well as white (W). When the color wheel 13 is driven to rotate, the annular portions traverses an optical path of illumination light and illumination light from light source 1 is time-divided into illumination light with respective colors of R, G, B, and further W and is incident on the light mixing element 2.

According to Practical example 3 having the above-mentioned configuration, it may be possible to obtain an apparatus for projecting a color image. The configurations of optical components other than the color wheel 13 may be able to be similar to the configurations of Practical example 1 and Practical example 2, and hence, it may be possible to obtain an image displaying apparatus capable of projecting a high-quality color image with an improved uniformity of illuminance on a surface to be projected.

It may be possible to widely utilize an image displaying apparatus according to an embodiment of the present invention as a projector or another image displaying apparatus for displaying a video signal from a personal computer, a television set, a DVD player or the like.

<An Illustrative Embodiment(s) of an Image Displaying Apparatus>

At least one illustrative embodiment of the present invention may relate to an image displaying apparatus for magnifying and projecting onto a screen an image and be referred to as a projector in general.

At least one illustrative embodiment of the present invention may aim at solving the problem(s) of a conventional technique(s) as described above, that is, providing an image displaying apparatus which is capable of reducing an irregularity of an illuminance on a surface to be projected while an increase of a mass and an increase of a cost are prevented.

Illustrative embodiment (1) is an image displaying apparatus (which has a most prominent feature of) including a light source, a light condenser for condensing light emitted from the light source to form a condensed light image at a predetermined position, a light mixing element having an entrance end near the condensed light image, a reflective image displaying element having plural micro-mirrors arranged two-dimensionally and configured to change an inclination angle of an individual micro-mirror between an on-state and an off-state so that emission of reflected light turns on or off, an illumination optical system composed of a condenser lens and a mirror for illumination arranged between an exit end of the light mixing element and the reflective image displaying element, and a projection optical system for projecting, onto a surface to be projected, reflected light from a micro-mirror being at an on-state among plural micro-mirrors constituting the reflective image displaying element, wherein the mirror for illumination is arranged at a position nearest the reflective image displaying element on an optical path from the light mixing element to the reflective image displaying element and a reflection surface of this mirror for illumination is positioned at a side of the reflective image displaying element with respect to a projection lens system constituting a part of the projection optical system.

Illustrative embodiment (2) is the image displaying apparatus as described in illustrative embodiment (1), wherein a part of a ridge line of a reflection surface of the mirror for illumination is positioned between an optical axis of the projection lens system and Rmax, wherein a center of the reflective image displaying element is an origin, a surface on which the reflective image displaying element is arranged is a surface including an x-axis and a z-axis orthogonal thereto, a direction of an optical axis of a projection lens system constituting the projection optical system is on a y-axis orthogonal to the x-axis and the z-axis, a largest height of the mirror for illumination in a direction of the y-axis is ymax, and a largest size of a lens barrel for holding the projection lens system in a range of an entrance end thereof to y=ymax in a direction of the x-axis and a direction of the z-axis from the optical axis is Rmax.

Illustrative embodiment (3) is the image displaying apparatus as described in illustrative embodiment (1) or (2), wherein the mirror for illumination is arranged in such a manner that a part of light rays incident on the projection optical system is blocked by a part of a ridge line of a reflection surface of the mirror for illumination when plural micro-mirrors constituting the reflective image displaying element are all at an on-state.

Illustrative embodiment (4) is the image displaying apparatus as described in illustrative embodiment (1), (2), or (3), wherein dsp/Rf≥0.89 wherein a minimum value of a distance from a ridge line of a reflection surface of the mirror for illumination arranged at a position nearest the reflective image displaying element to an optical axis of the projection lens on an optical path between the light mixing element and the reflective image displaying element is dsp and a maximum size of a light beam reflected from the reflective image displaying element and being incident on the projection lens system is Rf.

Illustrative embodiment (5) is the image displaying apparatus as described in any of illustrative embodiments (1) to (4), wherein the mirror for illumination arranged at a position nearest the reflective image displaying element on an optical path between the light mixing element and the reflective image displaying element has a beveled edge at a side of the projection lens system.

Illustrative embodiment (6) is the image displaying apparatus as described in any of illustrative embodiments (1) to (5), wherein the projection optical system is configured to have the projection lens system and a projection mirror in such a manner that an optical axis of the projection lens system is arranged to be parallel to the surface to be projected and the projection mirror is arranged to reflect a light beam transmitting through the projection lens system toward the surface to be projected.

Illustrative embodiment (7) is the image displaying apparatus as described in illustrative embodiment (6), wherein the projection optical system includes a flat glass plate at its end and the flat glass plate is arranged in a direction in which its light entrance and/or exit surface(s) is/are orthogonal to the surface to be projected.

Illustrative embodiment (8) is the image displaying apparatus as described in any of illustrative embodiments (1) to (7), wherein a rotational color filter is arranged near an entrance end or near an exit end of the light mixing element in the illumination optical system.

Illustrative embodiment (9) is the image displaying apparatus as described in any of illustrative embodiments (1) to (8), wherein the illumination optical system is composed of a condenser lens and first and second mirrors for illumination arranged at back thereof and a mirror for illumination arranged at a position nearest the reflective image displaying element is the second mirror for illumination.

Illustrative embodiment (10) is the image displaying apparatus as described in illustrative embodiment (6) or (7), wherein the projection mirror is arranged in such a manner that light transmitting through the projection lens system is reflected toward the surface to be projected being positioned obliquely upward, and a reflection surface of the projection mirror is formed of a free-form surface to correct a distortion of an image projected on the surface to be projected obliquely upward.

According to at least one illustrative embodiment of the present invention, it may be possible to extend an effective area in a reflection surface of a mirror for illumination and homogenize an illuminance on a micro mirror surface of a reflective image display element. Thereby, it may be possible to reduce an irregularity of an illuminance on an image area which is projected onto a surface to be projected and improve a quality of an image which is projected onto a surface to be projected.

Although the illustrative embodiment(s) and specific example(s) of the present invention have been described with reference to the accompanying drawings, the present invention is not limited to any of the illustrative embodiment(s) and specific example(s) and the illustrative embodiment(s) and specific example(s) may be altered, modified, or combined without departing from the scope of the present invention.

The present application claims the benefit of its priority based on Japanese patent application No. 2011-177824 filed on Aug. 16, 2011, the entire content of which is hereby incorporated by reference herein.

What is claimed is:

1. An image displaying apparatus comprising:
a light source;
a light condenser for condensing light emitted from the light source to form a condensed light image at a predetermined position;
a light mixing element having an entrance end near the condensed light image;
a reflective image displaying element having plural micro-mirrors arranged two-dimensionally and configured to change an inclination angle of an individual micro-mirror between an on-state and an off-state so that emission of reflected light turns on or off;
an illumination optical system including a condenser lens and a mirror for illumination arranged between an exit end of the light mixing element and the reflective image displaying element; and
a projection optical system for projecting, onto a surface to be projected, reflected light from a micro-mirror being at an on-state among plural micro-mirrors constituting the reflective image displaying element,
wherein the mirror for illumination is arranged at a position nearest the reflective image displaying element on an optical path from the light mixing element to the reflective image displaying element and a reflection surface of this mirror for illumination is positioned at a side of the reflective image displaying element with respect to a projection lens system constituting a part of the projection optical system.

2. The image displaying apparatus as claimed in claim 1, wherein a part of a ridge line of a reflection surface of the mirror for illumination is positioned between an optical axis of the projection lens system and Rmax, wherein a center of the reflective image displaying element is an origin, the reflective image displaying element is arranged on a surface including an x-axis and a z-axis orthogonal thereto, a direction of an optical axis of a projection lens system constituting the projection optical system is on a y-axis orthogonal to the x-axis and the z-axis, a largest height of the mirror for illumination in a direction of the y-axis is ymax, and a largest size of a lens barrel for holding the projection lens system in a range of an entrance end thereof to y=ymax in a direction of the x-axis and a direction of the z-axis from the optical axis is Rmax.

3. The image displaying apparatus as claimed in claim 1, wherein the mirror for illumination is arranged in such a manner that a part of light rays incident on the projection optical system is blocked by a part of a ridge line of a reflection surface of the mirror for illumination when plural micro-mirrors constituting the reflective image displaying element are all at an on-state.

4. The image displaying apparatus as claimed in claim 1, wherein a minimum value of a distance from a ridge line of a reflection surface of the mirror for illumination arranged at a position nearest the reflective image displaying element to an optical axis of the projection lens on an optical path between the light mixing element and the reflective image displaying element is dsp, a maximum size of a light beam reflected from the reflective image displaying element and being incident on the projection lens system is Rf, and dsp and Rf satisfy the following condition:

$$dsp/Rf \geq 0.89.$$

5. The image displaying apparatus as claimed in claim 1, wherein the mirror for illumination arranged at a position nearest the reflective image displaying element on an optical path between the light mixing element and the reflective image displaying element has a beveled edge at a side of the projection lens system.

6. The image displaying apparatus as claimed in claim 1, wherein the projection optical system is configured to have the projection lens system and a projection mirror in such a manner that an optical axis of the projection lens system is arranged to be parallel to the surface to be projected and the projection mirror is arranged to reflect a light beam transmitting through the projection lens system toward the surface to be projected.

7. The image displaying apparatus as claimed in claim 6, wherein the projection optical system includes a flat glass plate at its end and the flat glass plate is arranged in a direction in which its light entrance and/or exit surface(s) is/are orthogonal to the surface to be projected.

8. The image displaying apparatus as claimed in claim 1, wherein a rotational color filter is arranged near an entrance end or near an exit end of the light mixing element in the illumination optical system.

9. The image displaying apparatus as claimed in claim 1, wherein the illumination optical system is composed of a condenser lens and first and second mirrors for illumination arranged at back thereof and a mirror for illumination arranged at a position nearest the reflective image displaying element is the second mirror for illumination.

10. The image displaying apparatus as claimed in claim 6, wherein the projection mirror is arranged in such a manner that light transmitting through the projection lens system is reflected toward the surface to be projected being positioned obliquely upward, and a reflection surface of the projection mirror is formed of a free-form surface to correct a distortion of an image projected on the surface to be projected obliquely upward.

* * * * *